(12) United States Patent
Nakahara et al.

(10) Patent No.: US 9,298,059 B2
(45) Date of Patent: Mar. 29, 2016

(54) DISPLAY DEVICE

(71) Applicant: Sharp Kabushiki Kaisha, Osaka-shi, Osaka (JP)

(72) Inventors: Takahiro Nakahara, Osaka (JP); Eiji Satoh, Osaka (JP); Kohzoh Nakamura, Osaka (JP); Hisashi Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/400,360

(22) PCT Filed: May 15, 2013

(86) PCT No.: PCT/JP2013/063514
§ 371 (c)(1),
(2) Date: Nov. 11, 2014

(87) PCT Pub. No.: WO2013/172374
PCT Pub. Date: Nov. 21, 2013

(65) Prior Publication Data
US 2015/0131141 A1    May 14, 2015

(30) Foreign Application Priority Data

May 17, 2012  (JP) ................................. 2012-113830

(51) Int. Cl.
*G02F 1/167*  (2006.01)
*G02F 1/19*  (2006.01)
*G02F 1/133*  (2006.01)
*G02F 1/1335*  (2006.01)

(52) U.S. Cl.
CPC ............ *G02F 1/167* (2013.01); *G02F 1/13306* (2013.01); *G02F 1/133514* (2013.01); *G02F 1/133555* (2013.01); *G02F 1/133621* (2013.01); *G02F 1/19* (2013.01)

(58) Field of Classification Search
CPC ....... G02F 1/167; G02F 1/19; G02F 1/13306; G02F 1/133555; G02F 1/133621; G02F 1/133514
See application file for complete search history.

(56) References Cited

U.S. PATENT DOCUMENTS

2007/0159678 A1    7/2007   Verhaegh et al.

FOREIGN PATENT DOCUMENTS

JP    2003-161944 A    6/2003
JP    2007-506152 A    3/2007

OTHER PUBLICATIONS

NPL English Translation of International Preliminary Report on Patentability (PCT/IB/373) prepared for PCT/JP2013/063514, on Nov. 18, 2014.*

* cited by examiner

*Primary Examiner* — David N Spector
(74) *Attorney, Agent, or Firm* — Keating & Bennett, LLP

(57) ABSTRACT

The present invention provides a transflective display device which is high in transmittance, can secure sufficient brightness in display, and can display black. A transflective display device 1 includes a display panel 2 and a backlight 3. The display panel 2 includes a substrate 10 having an electrode 12, a substrate 20 having an electrode 22, and an optical modulation layer 30 containing shape-anisotropic members 32. A frequency of a voltage to be applied to the electrodes 12 and 22 is changed so as to rotate the shape-anisotropic members 32. When the shape-anisotropic members 32 are oriented such that their major axes extend in parallel with one of the substrates on which the shape-anisotropic members 32 abut, multiple reflection of incoming light is caused, and thus black is displayed.

15 Claims, 11 Drawing Sheets

(a)

(b)

(a)

(b)

(a)

(b)

(a)

(b)

(a)

(b)

DISPLAY DEVICE

TECHNICAL FIELD

The present invention relates to a transflective display device which carries out, in a switchable manner, reflection display and transmission display.

BACKGROUND ART

A liquid crystal display device is widely used in electronic apparatuses such as a monitor, a projector, a mobile phone, and a personal digital assistant (PDA).

Such liquid crystal display devices can be classified into three types, i.e., a reflective type, a transmissive type, and a transflective type (reflective and transmissive type).

Among these, a reflective and transmissive type liquid crystal display device carries out (i) transmission display by utilizing light of a backlight in a relatively dark place such as an indoor space and (ii) reflection display by utilizing illuminating light in a relatively bright place such as an outdoor space. This makes it possible to carry out display under any illumination (i.e., light environment) regardless of brightness of illumination. Under the circumstances, the transflective liquid crystal display device is widely provided in mobile apparatuses such as a mobile phone, a PDA, and a digital camera (for example, see Patent Literature 1, etc.)

FIG. 14 is a cross-sectional view schematically illustrating a configuration of a liquid crystal panel included in a liquid crystal display device disclosed in Patent Literature 1.

CITATION LIST

Patent Literature

[Patent Literature 1]
Japanese Patent Application Publication Tokukai No. 2003-161944 (Publication date: Jun. 6, 2003)
[Patent Literature 2]
Japanese Translation of PCT International Application Tokuhyo No. 2007-506152 (Publication date: Mar. 15, 2007)

SUMMARY OF INVENTION

Technical Problem

However, in the liquid crystal panel of such a transflective liquid crystal display device, one (1) pixel is divided into (i) a reflection display section in which a reflective electrode is provided and (ii) a transmission display section in which a transparent electrode is provided (see FIG. 14).

Therefore, when simply considered, an aperture ratio of each display is decreased to 50% or lower, and display with sufficient brightness cannot be carried out.

Moreover, in the liquid crystal panel, polarizing plates are provided on respective sides of a pair of substrates, which sides are opposite to counter-face surfaces to the liquid crystal layer, for controlling light transmission by causing only a polarization component in a particular direction to pass through (see FIG. 14). According to the configuration, light which has entered the liquid crystal panel only partially passes through the polarizing plates and is mostly absorbed by the polarizing plates. This absorption of light by the polarizing plates causes light loss, and the light loss reduces efficiency of light utilization. This is a major cause of decrease in transmittance.

As such, according to the liquid crystal panel, the polarizing plates are used, and therefore transmittance of light is low and display with sufficient brightness cannot be carried out.

Meanwhile, in recent years, a display panel has been developed which does not require a polarizing plate. Patent Literature 2 discloses a transflective display which transmits or reflects light that has entered a suspension layer containing a plurality of particles.

FIG. 15 is a cross-sectional view schematically illustrating, in each of (a) and (b), a configuration of a suspension particle device 301 which is used in the transflective display disclosed in Patent Literature 2. (a) of FIG. 15 is a cross-sectional view in a light transmitting state, and (b) of FIG. 15 is a cross-sectional view in a light reflecting state.

The suspension particle device 301 disclosed in Patent Literature 2 includes a transparent plate 303, an insulating substrate 304, and a suspending fluid 302 (i) which is provided between the transparent plate 303 and the insulating substrate 304 and (ii) in which reflective particles 311 are suspended in an insulating fluid 312 (see (a) and (b) of FIG. 15).

The suspension particle device 301 further includes (i) electrodes 305 and 306 between which an electric field V1 is applied so that the reflective particles 311 are oriented in a direction perpendicular to the transparent plate 303 and the insulating substrate 304 and (ii) electrodes 308 and 309 between which an electric field V2 is applied so that the reflective particles 311 are oriented in a direction parallel to the transparent plate 303 and the insulating substrate 304.

According to the configuration, the suspension particle device 301 applies a voltage to the reflective particles 311 so that the reflective particles 311 are oriented in the perpendicular or parallel direction, and thereby causing light from a backlight (not illustrated) to pass through or reflecting outside light so as to carry out display.

However, the transflective display disclosed in Patent Literature 2 merely displays light of the backlight (not illustrated) in a light transmitting state and displays light reflected by the reflective particles 311 in a light reflecting state, and cannot display "black".

The present invention is accomplished in view of the problem, and its object is to provide a transflective display device that is high in light transmittance, can secure sufficient brightness in display, and can display black.

Solution to Problem

In order to attain the object, a display device of the present invention is a display device of transflective type which includes: a display panel; and a backlight, the display device carrying out, in a switchable manner, (i) reflection display by reflecting light entered from outside and (ii) transmission display by causing light from the backlight to pass through, the display panel including: (I) (i) a first substrate which has a first electrode, (ii) a second substrate which has a second electrode and is arranged so as to face the first substrate, and (II) an optical modulation layer which contains (iii) a plurality of shape-anisotropic members and is provided between the first substrate and the second substrate, each of the plurality of shape-anisotropic members having a reflection surface and changing, by rotation, an area of a projection image viewed in a normal direction of the substrate, the display device controlling a transmittance of light, which has entered the optical modulation layer, by rotating the plurality of shape-anisotropic members by changing a frequency of a voltage applied between the first electrode and the second electrode, and (III) the display device displaying black by multiple reflection of the light that has entered the optical modulation layer and is reflected by the plurality of shape-anisotropic members which are oriented so as to abut on one of the first substrate and the second substrate such that a major axis of each of the plurality of shape-anisotropic members extends in parallel with the one of the first substrate and the second substrate.

According to the configuration, the plurality of shape-anisotropic members are rotated by changing the frequency of the voltage applied between the first electrode and the second electrode so that the area of the projection image by the plurality of shape-anisotropic members is changed when viewed in the normal direction of the substrate, and thus the transmittance of light entered the optical modulation layer can be controlled. This makes it possible to achieve reflection display and transmission display only by rotating (orienting) the plurality of shape-anisotropic members.

Moreover, in this case, the display device displays black by multiple reflection of the light that has entered the optical modulation layer and is reflected by the plurality of shape-anisotropic members which are rotated to be oriented so as to abut on one of the first substrate and the second substrate such that a major axis of each of the plurality of shape-anisotropic members extends in parallel with the one of the first substrate and the second substrate. This makes it possible to display black only by rotating (orienting) the plurality of shape-anisotropic members.

As such, black can be displayed and the reflection display and the transmission display can be switched without dividing one (1) pixel into a transmission display area and a reflection display area for displaying black. The display device can both (i) display black and (ii) switch the entire one (1) pixel between the transmission display and the reflection display.

Moreover, according to the configuration, it is not necessary to separately provide an electrode for orienting reflective particles in a direction perpendicular to the substrate and an electrode for orienting the reflective particles in a direction parallel to the substrate, unlike Patent Literature 2. Furthermore, it is not required to provide a polarizing plate, unlike the liquid crystal display device.

Therefore, according to the configuration, it is possible to provide the transflective display device which has a simple configuration, is high in light transmittance, can secure sufficient brightness in display, and can display black.

It is preferable that an amount of the plurality of shape-anisotropic members contained in the optical modulation layer is enough to form at least two layers of the plurality of shape-anisotropic members when the plurality of shape-anisotropic members are spread all over the one of the first substrate and the second substrate.

According to the configuration, it is possible to orient the plurality of shape-anisotropic members to be adjacent to each other in two or more layers on the substrate. This makes it possible to surely form a layer in which surfaces of the shape-anisotropic members are inclined so as to cause multiple reflection.

Therefore, even in a case where the plurality of shape-anisotropic members are configured by simple rectangular parallelepiped flakes, the shape-anisotropic members in the upper most layer do not become in parallel with the substrate and cause multiple reflection of outside light, and therefore the light does not return to an entering side. This causes reduction in reflected light, and it is therefore possible to display black.

Note that it is preferable to employ the rectangular parallelepiped flakes as the plurality of shape-anisotropic members because it is possible to achieve bright display at low cost. It is highly advantageous to cause multiple reflection by the use of such rectangular parallelepiped flakes.

Therefore, the plurality of shape-anisotropic members are preferably rectangular parallelepiped flakes.

Moreover, it is more preferable that an amount of the plurality of shape-anisotropic members contained in the optical modulation layer is enough to form several tens of layers of the plurality of shape-anisotropic members when the plurality of shape-anisotropic members are spread all over the one of the first substrate and the second substrate.

This makes it possible to further surely form, across the entire substrate, a layer in which surfaces of the shape-anisotropic members are inclined so as to cause multiple reflection.

The display device can have a configuration in which the voltage applied between the first electrode and the second electrode is switched between (i) DC at which a frequency is 0 Hz or a low frequency which is equal to or lower than a first threshold set in advance and (ii) a high frequency which is equal to or higher than a second threshold set in advance.

This makes it possible to control a transmittance of light, which has entered the optical modulation layer, by rotating the plurality of shape-anisotropic members so as to change the area of the projection image by the plurality of shape-anisotropic members viewed in the normal direction of the substrate.

The display device can have a configuration in which the major axis of each of the plurality of shape-anisotropic members is oriented in parallel with the first substrate and the second substrate when the voltage applied between the first electrode and the second electrode is the DC or has the low frequency which is equal to or lower than the first threshold; and the major axis of each of the plurality of shape-anisotropic members is oriented in a direction perpendicular to the first substrate and the second substrate when the voltage applied between the first electrode and the second electrode has the high frequency which is equal to or higher than the second threshold.

It is preferable that the plurality of shape-anisotropic members have chargeability.

According to the configuration, it is possible to rotate the plurality of shape-anisotropic members by changing the frequency of the voltage applied between the first substrate and the second substrate, and further, it is possible to orient the plurality of shape-anisotropic members such that the plurality of shape-anisotropic members adhere to a substrate that includes an electrode charged with a polarity which is reverse to a polarity of electric charge of the plurality of shape-anisotropic members.

According to the display device, it is preferable that the plurality of shape-anisotropic members abut on one of the first and second substrates which includes an electrode that is electrically charged with a polarity reverse to that of an electric charge of the plurality of shape-anisotropic members; and on which one of the first substrate and the second substrate the plurality of shape-anisotropic members abut is switched by reversing each of a polarity of an electric charge of the first electrode and a polarity of an electric charge of the second electrode.

This makes it possible to switch, for example, white display and black display in the reflection display. Moreover, in a case where, for example, the backlight is driven by area active driving, it is possible to carry out displays which are different for each lighting region (i.e., each divisional lighting area, e.g., each pixel) which have been set in advance.

According to the display device, it is preferable that the plurality of shape-anisotropic members are caused to abut on any one of the first substrate and the second substrate for causing multiple reflection in each of the transmission display and the reflection display so that black is displayed in each of the reflection display and the transmission display only by orienting the plurality of shape-anisotropic members.

This makes it possible to provide the transflective display device which can display black both in the reflection display and the transmission display.

According to the display device, it is preferable that a light emission surface of the backlight is partitioned into a plurality of divisional lighting areas, and light sources are provided in the respective plurality of divisional lighting areas.

According to the configuration, it is possible to switch between the transmission display and the reflection display for each divisional lighting area (e.g., for each pixel) by carrying out area active driving.

It is preferable that the light sources provided in the respective plurality of divisional lighting areas emit different colors of light, and each of the light sources emits one or more colors of light.

According to the configuration, it is possible to carry out color display without using a color filter by orienting the plurality of shape-anisotropic members such that light entered the optical modulation layer from the backlight passes through the optical modulation layer in the transmission display (e.g., by orienting in a direction perpendicular to the substrate).

It is preferable that each of the light sources emits a single color of light.

According to the configuration, it is possible to display a predetermined color for each of the divisional lighting areas with a simple configuration.

According to the display device, it is preferable that an emitted light color is switched for each of the plurality of divisional lighting areas.

This makes it possible to arbitrarily switch the emitted light color of the backlight in an arbitrary area.

According to the display device, it is preferable that a partition is provided in the optical modulation layer in a location which corresponds to a boundary between the plurality of divisional lighting areas of the backlight, when viewed in a direction perpendicular to the substrate.

This makes it possible to prevent the shape-anisotropic members from moving and being unevenly distributed in a display area of the display panel which area corresponds to each of the plurality of divisional lighting areas of the backlight. Moreover, in a case where color display is carried out, it is possible to prevent color mixture in each of display areas of the display panel which correspond to the respective plurality of divisional lighting areas of the backlight.

Moreover, the plurality of shape-anisotropic members are preferably colored.

According to the configuration, it is possible to view reflection colors from the plurality of shape-anisotropic members when the plurality of shape-anisotropic members are oriented such that the plurality of shape-anisotropic members abut on the substrate on a display surface side and the major axis of each of the plurality of shape-anisotropic members, which abut on the substrate on the display surface side, extends in parallel with the substrate on the display surface side. Therefore, according to the configuration, it is possible to carry out color display in the reflection display without using a color filter.

According to the display device, it is preferable that the transmission display and the reflection display are simultaneously carried out by driving the backlight with area active driving.

In an area in which the reflection display is carried out, the backlight can be turned off. Therefore, according to the configuration, it is possible to provide the transflective display device which can (i) carry out the transmission display and the reflection display simultaneously and (ii) reduce power consumption.

Note that, in this case, it is possible to employ a configuration in which, for example, the reflection display is carried out in a part in which white or black is displayed and the transmission display is carried out in a part in which color display is carried out.

According to the configuration, it is possible to employ a configuration in which (i) display is carried out by turning off the backlight in the part for displaying white or black and (ii) excellent color display can be carried out by the transmission display. It is therefore possible to carry out excellent color display while suppressing power consumption.

It is preferable that a color filter is provided in each of pixels of the display panel.

According to the configuration, it is possible to carry out excellent full-color display with a simple configuration.

Note that, in this case, it is preferable that the color filter is provided on the substrate on the display surface side. This makes it possible to inhibit parallax caused between the optical modulation layer and the color filter when the plurality of shape-anisotropic members are oriented on the display surface side substrate for color display. As such, it is possible to achieve high quality color display.

Advantageous Effects of Invention

As above described, the display device of the present invention is the transflective display device that carries out, in a switchable manner, the reflection display and the transmission display. According to the present invention, the plurality of shape-anisotropic members in the optical modulation layer provided between the first and second substrates, which are arranged to face each other, are rotated by changing the frequency of the voltage applied between the first and second electrodes, and the transmittance of light entered the optical modulation layer can be thus controlled. Therefore, it is possible to carry out the reflection display and the transmission display only by rotating (orienting) the plurality of shape-anisotropic members.

According to the configuration, in a case where the plurality of shape-anisotropic members are rotated to be oriented so as to abut on one of the first substrate and the second substrate such that a major axis of each of the plurality of shape-anisotropic members extends in parallel with the one of the first substrate and the second substrate, black is displayed by multiple reflection of light which has entered the optical modulation layer. As such, it is possible to display black only by rotating (orienting) the plurality of shape-anisotropic members.

Therefore, according to the present invention, it is possible to provide the transflective display device which has a simple configuration, is high in light transmittance, can secure sufficient brightness in display, and can display black.

DESCRIPTION OF EMBODIMENTS

The following description will discuss embodiments of the present invention in detail.

[Embodiment 1]

The following description will discuss an embodiment of the present invention with reference to (a) and (b) of FIG. 1 through FIG. 5.

<Schematic Configuration of Display Device>

Figure 1:
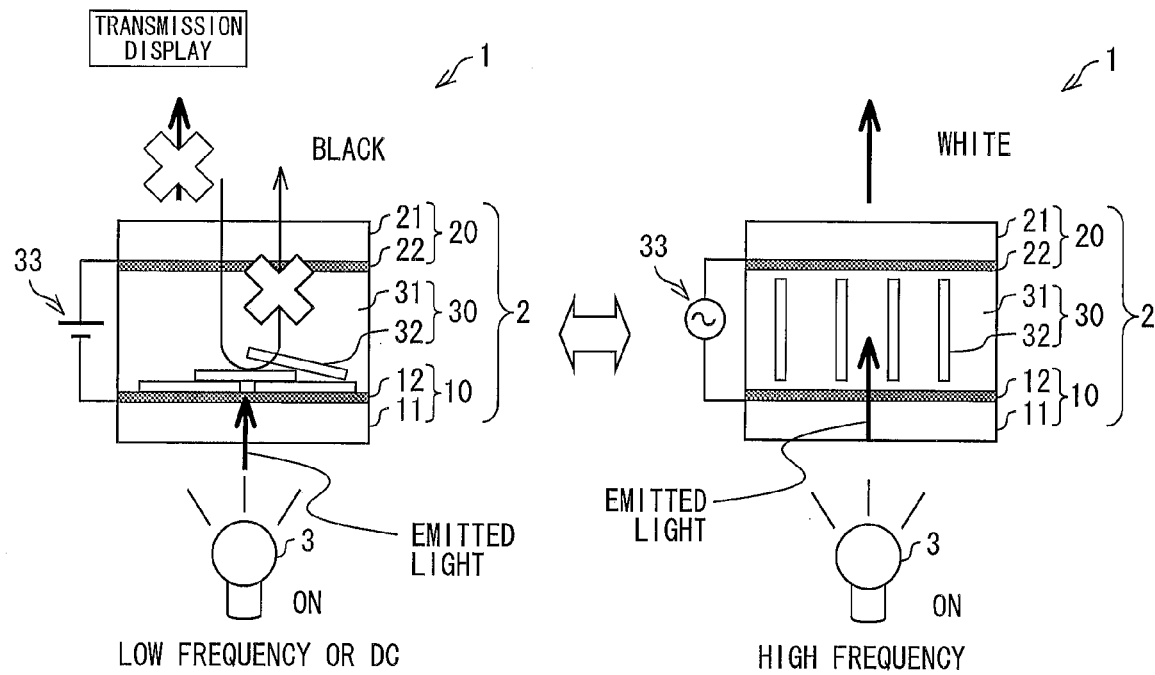
FIG. 1 is a cross-sectional view schematically illustrating, in (a) and (b), a configuration of main parts of a display device, in accordance with Embodiment 1 of the present invention.
Figure 1:
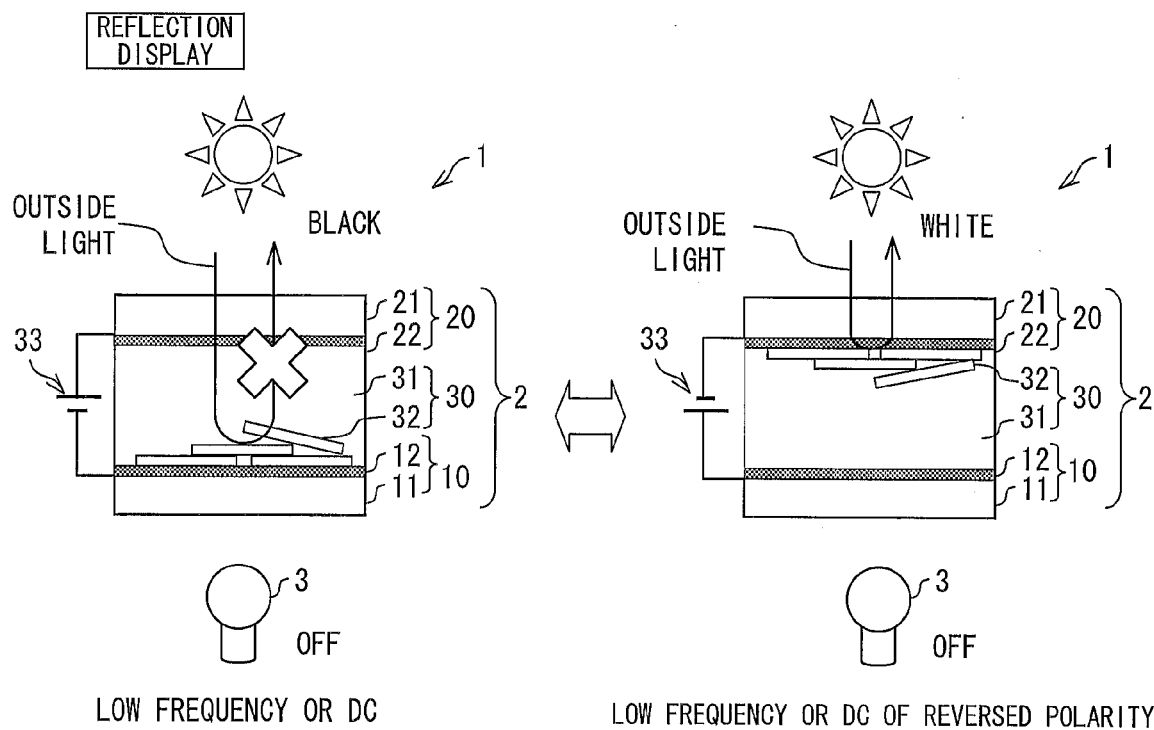

FIG. 1 is a cross-sectional view schematically illustrating, in (a) and (b), a configuration of main parts of a display device 1, in accordance with the present embodiment. FIG. 1 illustrates a state in which shape-anisotropic members 32 (e.g., metal flakes) are variously changed in terms of oriented direction and oriented (stacked) location.

(a) of FIG. 1 is a cross-sectional view illustrating a case where black display and white display are carried out by transmission display. (b) of FIG. 1 is a cross-sectional view illustrating a case where black display and white display are carried out by reflection display. Each of right and left parts of each (a) and (b) of FIG. 1 shows a schematic configuration of 1 pixel.

As illustrated in (a) and (b) of FIG. 1, the display device 1 of the present embodiment includes a display panel 2, a backlight 3 for emitting light toward the display panel 2, and a driving circuit (not illustrated). The display device 1 is a so-called transflective display device that carries out display (i) by causing light from the backlight 3 to pass through the display panel 2 and (ii) by reflecting entered outside light.

Note that the backlight 3 has a conventional configuration. Therefore, a description of the configuration of the backlight 3 is omitted. As the backlight 3, for example, a surface light source device of edge light type or direct type, etc., can be used as appropriate. As a light source (light emission source) of the backlight 3, a linear light source such as a fluorescent tube, a point light source such as a light emitting diode (LED), or the like can be used as appropriate.

Note that (a) and (b) of FIG. 1 exemplify a case in which an LED is used as the light source of the backlight 3 and the light source of the backlight 3 is indicated as the backlight 3. The LED can be (i) an LED (white light-emitting element) that emits white light by a single LED chip, (ii) a white light-emitting element in which LED chips of R (red), G (green), and B (blue) are molded as one (1) package, or (iii) a white light-emitting element in which, for example, a blue LED and a yellow emission fluorescent substance are combined. As in an embodiment described later, for example, an LED that emits light whose color is R, G. or B can be used as the backlight 3 (that is, the light source of the backlight 3).

The display panel 2 includes substrates 10 and 20 which are arranged so as to face each other, and an optical modulation layer 30 provided between the substrates 10 and 20.

Moreover, the display panel 2 has a plurality of pixels arranged in a matrix manner.

The following description will discuss an example case in which the substrate 10 (first substrate) is provided on a backlight 3 side (i.e., rear surface side) and the substrate 20 (second substrate) is provided on a display surface side (i.e., viewer side). Note, however, that the present embodiment is not limited to this.

The following describes the configurations.

<Substrate 10 and Substrate 20>

The substrate 10 is an active matrix substrate. The substrate 10 has a configuration in which signal lines (a scanning signal line, a data signal line, and the like), a switching element such as TFT (thin film transistor), and an insulating film (which are not illustrated) are provided on an insulating substrate 11 and are covered with an electrode 12 (pixel electrode). Note that each of driving circuits (scanning signal line driving circuit, data signal line driving circuit, and the like) for driving the signal lines has a conventional configuration.

The electrode 12 is connected with the signal lines (scanning signal line, data signal line) and the switching element such as TFT via a drain electrode (not illustrated), and a signal corresponding to an image signal is applied to the electrode 12.

Meanwhile, the substrate 20 is a counter substrate, and includes an insulating substrate 21 and an electrode 22 (common electrode) which is provided on the insulating substrate 21.

Each of the insulating substrates 11 and 21 is not limited to a particular one provided that the one has a light-transmitting property and an insulating property, and can be a transparent substrate such as a glass substrate.

Each of the electrodes 12 and 22 is a transparent electrode, and is formed by, for example, a transparent conductive film made of ITO (indium tin oxide), IZO (indium zinc oxide), zinc oxide, tin oxide, or the like. The electrode 12 is provided for each of the pixels, and the electrode 22 are provided as a solid electrode that is common to all the pixels. Note that the electrode 22 can be provided for each of the pixels, as with the electrode 12.

A thickness and a formation method of the electrodes 12 and 22 are not limited to particular ones, and can be designed and selected in a manner similar to that of a liquid crystal panel. Moreover, a material, a layer thickness, a formation method, etc. of the switching element, the signal lines, the insulating layer, and the like can also be designed and selected in a manner similar to that of a liquid crystal panel.

<Optical Modulation Layer 30>

The optical modulation layer 30 is provided between the substrates 10 and 20, and includes a medium 31 and a plurality of shape-anisotropic members 32 which are contained in the medium 31.

The optical modulation layer 30 is formed by enclosing the medium 31 containing the shape-anisotropic member 32 in a gap between the substrates 10 and 20 that are adhered to each other with a sealing agent (not illustrated) while a spacer (not illustrated) is provided between the substrates 10 and 20.

When a voltage is applied to the electrodes 12 and 22 by a power source circuit 33 (power source) connected with the electrodes 12 and 22, an electric field is applied to the optical modulation layer 30. In this case, in accordance with a change in frequency of the voltage applied between the electrodes 12 and 22, the optical modulation layer 30 changes (i) transmittance of light which has emitted by the backlight 3 and entered the optical modulation layer 30 and (ii) reflectance of light (outside light) which has entered the optical modulation layer 30 from outside. In this specification, a case in which a frequency of an AC (alternating current) voltage becomes 0 Hz is referred to as "DC (direct current)". A thickness (cell thickness) of the optical modulation layer 30 is set in accordance with a length of the shape-anisotropic member 32 in a long-axis direction, and can be, for example, 80 µm.

<Shape-anisotropic Member 32>

The shape-anisotropic member 32 is a responsive material having a shape-anisotropic property, and rotates or is transformed in accordance with a direction of an electric field. In view of display property, an area of a projection image of the shape-anisotropic member 32 in a plan view (i.e., viewed in a normal direction of the substrates 10 and 20) is changed in accordance with a direction in which an electric field is applied to the optical modulation layer 30. It is preferable that the projected area ratio (i.e., maximum projected area:minimum projected area) is 2:1 or higher.

A shape of the shape-anisotropic member 32 can be, for example, a flake shape, a columnar shape, an ellipsoidal shape, or a fiber shape.

A flake-shaped shape-anisotropic member 32 (flake) can be, for example, a simple rectangular parallelepiped (flat, plane) flake or a flake having a curved surface, i.e., a bowl-shaped flake (having convexo-concave surface).

A fiber-shaped shape-anisotropic member 32 (fiber) can be configured by, for example, coating a transparent columnar glass with a reflection coating (metal coating or metal and resin coating).

Among those, it is preferable to employ the simple rectangular parallelepiped (flat, plane) flake (flake-shaped shape-anisotropic member 32) as the shape-anisotropic member 32, in view of manufacturing cost and because bright display can be obtained by orienting the shape-anisotropic members 32 in a direction perpendicular to the substrates 10 and 20 (longitudinal orientation).

For example, in a case where a flake (i.e., a flake-shaped shape-anisotropic member) is employed as the shape-anisotropic member 32, a thickness of the shape-anisotropic member 32 is preferably 1 µm or smaller, and more preferably 0.1 µm or smaller.

As the thickness of the shape-anisotropic member 32 becomes smaller, it is possible to achieve black display with higher transmittance and less scattering. Therefore, the thickness of the shape-anisotropic member 32 is preferably equal to or smaller than, particularly, a wavelength of light (e.g., 0.5 µm or smaller), regardless of the shape.

Moreover, the shape-anisotropic member 32 is positively or negatively charged in the medium 31 and reflects visible light.

As the shape-anisotropic member 32, for example, (i) a member that can give and receive electrons with electrodes, a medium, or the like and (ii) a member which is modified with an ionic silane coupling agent or the like.

The shape-anisotropic member 32 can be made of, for example, metal, a semiconductor, a dielectric substance, or a mixture of these. Alternatively, the shape-anisotropic member 32 can be made of a dielectric multilayer film or cholesteric resin.

Note that a surface of the shape-anisotropic member 32 can be subjected to a mirror finish in order to enhance reflectiveness, or can be formed to be an uneven surface.

In a case where the shape-anisotropic members 32 are made of metal, aluminum flakes, which are generally used for coating painting, can be employed. For example, the shape-anisotropic member 32 can be an aluminum (Al) flake whose diameter is 20 µm and thickness is 0.3 µm.

The shape-anisotropic member 32 can be colored. For example, the shape-anisotropic member 32 can be colored by coating with pigment-containing resin, an interference film, or the like, or the shape-anisotropic member 32 can be made of a colored member.

A specific gravity of the shape-anisotropic members 32 is preferably 11 g/cm3 or lower, more preferably 3 g/cm3 or lower, further preferably substantially equivalent to a specific gravity of the medium 31. This is because, in a case where the specific gravity of the shape-anisotropic members 32 is significantly different from that of the medium 31, there occurs a problem that the shape-anisotropic members 32 precipitate or float.

According to the present embodiment, as illustrated in (a) and (b) of FIG. 1, an amount of the shape-anisotropic members 32 is enough to cause multiple reflection of light, which has entered the optical modulation layer 30, by the shape-anisotropic members 32 when the shape-anisotropic members 32 are oriented (stacked) (i) so as to abut on the substrate 10 on the rear surface side (for the viewer) and (ii) such that a major axis of each of the shape-anisotropic member 32 abutting on the substrate 10 extends in parallel with the substrate 10 (in other words, when the shape-anisotropic members 32 are oriented so as to adhere to the substrate 10). This makes it possible to switch between the reflection display and the transmission display in one (1) pixel.

Specifically, the amount of the shape-anisotropic members 32 is enough to form two layers of the shape-anisotropic members 32, preferably several tens of layers of the shape-anisotropic members 32. That is, the optical modulation layer 30 contains the shape-anisotropic members 32 whose amount is enough to form at least two layers, preferably several tens of layers of the shape-anisotropic members 32 are formed (stacked) when the shape-anisotropic members 32 are spread all over the one of the substrates (in this case, the substrate 10).

By thus stacking at least two layers of the shape-anisotropic members 32 on the substrate 10, it is possible to surely form a layer in which a shape-anisotropic member 32 is inclined (i.e., the surface of the shape-anisotropic member 32 is inclined) so that multiple reflection is caused. Therefore, even in a case where the shape-anisotropic members 32 are configured by rectangular parallelepiped flakes, the shape-anisotropic members 32 in the upper most layer do not become in parallel with the substrates 10 and 20 and cause multiple reflection of outside light, and therefore the light does not return to an entering side. This causes reduction in reflected light, and it is therefore possible to display black.

Moreover, in a case where the amount of the shape-anisotropic members 32 is enough to form the several tens of layers as above described, it is possible to further surely form, across the entire substrate, a layer in which the shape-anisotropic members 32 are inclined so as to cause multiple reflection.

In a case where rectangular parallelepiped flakes, whose amount is equal to or slightly more than an amount required to form one (1) layer of flakes to cover the surface of the substrate 10, are employed as the shape-anisotropic members 32, it is unlikely that the flakes are spread without gap, and it is likely that the flakes are spread with some gaps and are partially stacked in two or more layers.

Figure 4:
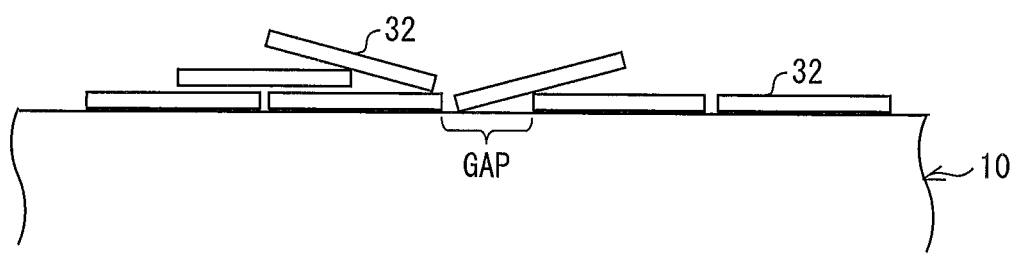
FIG. 4 is a schematic view illustrating a state in which flakes are used, as shape-anisotropic members, whose amount is more than an amount required to cover a surface of a substrate with one (1) layer of flakes, and a part of a flake is obliquely inserted between two other flakes.

FIG. 4 schematically illustrates a state in which flakes, whose amount is slightly more than an amount required to form one (1) layer of flakes to cover the surface of the substrate 10, are employed as the shape-anisotropic members 32, and a part of a flake is obliquely inserted between two other flakes.

As illustrated in FIG. 4, in a case where the flakes are stacked on the substrate 10 with a gap between a flake and another flake, a part of a flake is inserted into the gap or a flake obliquely leans on other flakes stacked in two or more layers. As such, flakes which are not in parallel with the substrate exist, and the inclined flakes cause multiple reflection.

In this case, however, it is possible that, for example, light emitted by the backlight 3 passes through the gap, or light reflected by the flake returns to the viewer side.

Moreover, for example, even in a case where the shape-anisotropic members 32 are made up of bowl-shaped flakes each of which has a curved surface and an amount of the flakes is only for one layer of flakes, multiple reflection may be caused depending on a manner in which the flakes overlap. However, in order to cause sufficient multiple reflection and cancel reflected light, the one layer of flakes is not enough even though the flakes are bowl-shaped.

On this account, in order to cause sufficient multiple reflection and cancel reflected light, the optical modulation layer 30 contains the shape-anisotropic members 32 whose amount is preferably enough to form at least two layers of the shape-anisotropic members 32 on the substrate 10, more preferably enough to form several tens of layers of the shape-anisotropic members 32 on the substrate 10.

As above described, even in a case where bowl-shaped flakes are used with an amount only for one layer of flakes, multiple reflection may be caused depending on a manner in which the flakes overlap. However, in a case where the bowl-shaped flakes are oriented in a direction perpendicular to the substrate (longitudinal orientation), light may be scattered due to the shape of the flakes, depending on a degree of the curve of the surface. This may cause dark display because light emitted by the backlight does not sufficiently passes through. Moreover, in a case where the bowl-shaped flakes are used, a cost is increased as compared with a case where simple rectangular parallelepiped flakes are used.

Therefore, although the above described various shapes of shape-anisotropic members can be used as the shape-anisotropic member 32, it is preferable to use rectangular parallelepiped flakes in order to achieve bright display at low cost. It is highly advantageous to cause multiple reflection by the use of such rectangular parallelepiped flakes.

<Medium 31>

The medium 31 is made of a material that has a light-transmitting property in a visible region. Such a material can be, for example, a liquid which hardly absorbs light in the visible region and is optionally colored with pigment. It is preferable that a specific gravity of the medium 31 is similar to that of the shape-anisotropic member 32.

The medium 31 is preferably low in volatility, by taking into consideration a step of enclosing the medium 31 into a cell. Moreover, viscosity of the medium 31 relates to responsiveness and is preferably 5 mPa·s or lower, and is preferably 0.5 mPa·s or higher in order to prevent precipitation of the shape-anisotropic members 32.

The medium 31 can be made of a single substance or can be made of a mixture of a plurality of substances. For example, propylene carbonate, NMP (N-methyl-2-pyrrolidone), fluorocarbon, silicone oil, or the like can be used.

<Display Method>

The following description will discuss details of a display method (driving method) for the display panel 2 of the display device 1. Note that the following describes an example case in which flakes are employed as the shape-anisotropic members 32.

As a basic operation, the following first describes a method for controlling transmittance and reflectance of light by the optical modulation layer 30.

As early described, the display panel 2 of the present embodiment includes (i) the optical modulation layer 30 in which the shape-anisotropic members 32 are dispersed in the medium 31 and (ii) the electrodes 12 and 22 for applying an electric field to the optical modulation layer 30. By changing a frequency of a voltage applied between the electrodes 12 and 22, an orientation (i.e., area of projection image) of the shape-anisotropic members 32 can be reversibly switched. Further, by switching between a polarity of an electric charge of the electrode 12 and a polarity of an electric charge of the electrode 22, it is possible to switch on which one of the substrates the shape-anisotropic members 32 are oriented (i.e., stacked) in such a manner as to adhere to the one of the substrates.

For example, in a case where a high-frequency voltage (AC voltage) having, for example, a frequency of 60 Hz is applied between the electrodes 12 and 22, the flakes are rotated, by force explained in view of dielectrophoresis phenomenon, Coulomb force, or electrical energy, such that major axes of the flakes are oriented in parallel with the line of electric force (see the right part of (a) of FIG. 1). That is, the flakes are oriented such that their major axes become perpendicular to the substrates 10 and 20 (longitudinal orientation).

Therefore, in a case where, for example, the flakes are metal flakes which have a visible light reflecting property, the reflection surfaces of the flakes become perpendicular to the substrates 10 and 20 by the longitudinal orientation. As a result, light, which has emitted by the backlight 3 and entered the optical modulation layer 30, directly permeates (passes through) the optical modulation layer 30 or is reflected by the reflection surfaces and then emitted through a surface (i.e., on viewer side) which is opposite to the side from which the light has entered (see right part of (a) of FIG. 1).

Meanwhile, in a case where a low-frequency voltage having, for example, a frequency of 0.1 Hz or a DC voltage (at frequency of 0 Hz) is applied between the electrodes 12 and 22, the flakes having the chargeability are gathered, by force explained in view of electrophoretic force or Coulomb force, to the vicinity of an electrode which is charged with a polarity reverse to a polarity of an electric charge of the flakes (see the left part of (a) of FIG. 1 and the left and right parts of (b) of FIG. 1). Then, the flakes are rotated so as to adhere to the substrate 10 or the substrate 20 with a most stable orientation.

As a result, the flakes are oriented (in transverse orientation) such that the major axes of the flakes extend in parallel with one of the substrates 10 and 20 on which one the flakes abut (i.e., one of the substrates 10 and 20 which includes the electrode charged with a polarity reverse to a polarity of an electric charge of the flakes).

Therefore, in this case, for example, metal flakes having a visible light reflecting property are employed, the reflection surfaces of the flakes become in parallel with the substrates 10 and 20 by the transverse orientation. As a result, light which has entered the optical modulation layer 30 from outside (e.g., light emitted by the backlight 3 and entered the optical modulation layer 30 or outside light entered the optical modulation layer 30) is reflected by the reflection surfaces and does not pass through a surface opposite to a surface via which the light has entered.

By thus switching the voltage to be applied to the optical modulation layer 30 between DC (at frequency of 0 Hz) and AC or between the low frequency and the high frequency, it is possible to change transmittance of light (amount of transmitted light) which has entered the optical modulation layer 30 from the backlight 3.

Note that, the frequency at which the flakes are in the transverse orientation (i.e., switched to transverse orientation) is, for example, 0 Hz to 0.5 Hz, and the frequency at which the flakes are in the longitudinal orientation (i.e., switched to longitudinal orientation) is, for example, 30 Hz to 1 kHz.

The frequency is set in advance in accordance with a shape and a material of the flakes (i.e., shape-anisotropic members 32), a thickness (i.e., cell thickness) of the optical modulation layer 30, and the like. That is, the display device 1 switches the frequency of the voltage to be applied to the optical modulation layer 30 between a low frequency which is equal to or lower than a first threshold and a high frequency which is equal to or higher than a second threshold, and thus changes transmittance of light (i.e., amount of transmitted light). In this case, for example, the first threshold can be set to 0.5 Hz, and the second threshold can be set to 30 Hz.

Note that (a) and (b) of FIG. 1 illustrate an example case in which the flakes are positively charged.

Here, in a case where, for example, (i) a DC voltage is applied between the electrodes 12 and 22, (ii) a negative side of the power source circuit 33 is connected to the electrode 12, and (iii) a positive side of the power source circuit 33 is connected to the electrode 22, the flakes are oriented in such a manner as to adhere to the substrate 10 in which the negatively charged electrode 12 is provided, as illustrated in the left part of (a) of FIG. 1 and the left part of (b) of FIG. 1.

Alternatively, in a case where, for example, (i) a DC voltage is applied between the electrodes 12 and 22, (ii) a negative side of the power source circuit 33 is connected to the electrode 22, and (iii) a positive side of the power source circuit 33 is connected to the electrode 12, the flakes are oriented in such a manner as to adhere to the substrate 20 in which the negatively charged electrode 22 is provided, as illustrated in the right part of (b) of FIG. 1.

As such, according to the display device 1 of the present embodiment, it is possible to switch on which of the substrates 10 and 20 the flakes are oriented in the transverse orientation, by switching a polarity of a DC voltage to be applied between the electrodes 12 and 22 between which the optical modulation layer 30 is provided.

Note that the display device 1 includes a control section (not illustrated) for (i) controlling, as above described, the power source circuit 33 to apply a voltage between the electrodes 12 and 22 at a frequency suitable for transmission display and reflection display and (ii) switching a polarity of the voltage to be applied between the electrodes 12 and 22.

The display device 1 can include a light sensor (not illustrated) such as a photodiode for detecting a level of ambient light in the vicinity of the display device 1. In such a case, the control section can determine, based on data sent from the light sensor, which of the transmission display and the reflection display is to be carried out.

Figure 2:
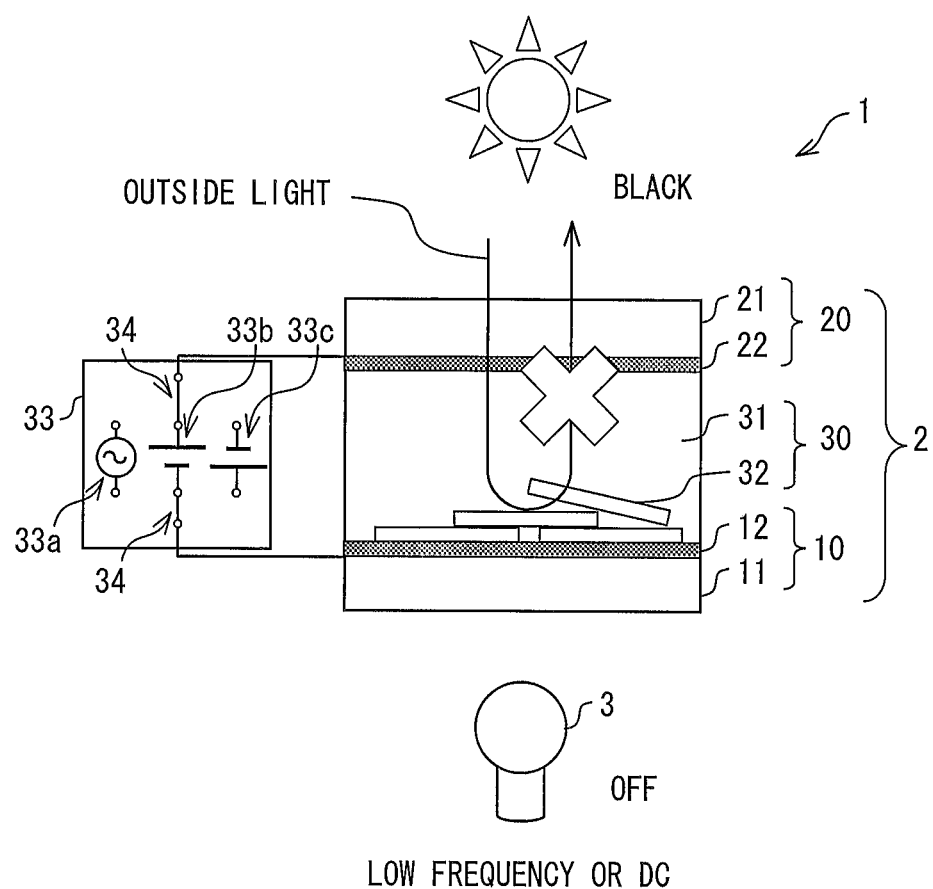
FIG. 2 is a cross-sectional view schematically illustrating an example of a configuration of a power source circuit provided in the display device illustrated in (a) and (b) of FIG. 1.

FIG. 2 is a cross-sectional view schematically illustrating an example of a configuration of the power source circuit 33 of display device 1 illustrated in (a) and (b) of FIG. 1.

Note that FIG. 2 illustrates, as an example, the case illustrated in the left part of (b) of FIG. 1.

As illustrated in FIG. 2, the display device 1 of the present embodiment includes the power source circuit 33 that has an AC power source 33a, DC power sources 33b and 33c which are reverse in terms of an arrangement of positive and negative, and a switch 34 (switching device) for switching connections between (i) the electrodes 12 and 22 and (ii) the AC power source 33a and the DC power sources 33b and 33c.

According to the display device 1, for example, a switching signal is inputted from the control section (not illustrated) to the power source circuit 33 for switching the power sources to be connected to the electrodes 12 and 22. Based on the switching signal thus inputted, the power sources to be connected to the electrodes 12 and 22 are switched, and it is therefore possible to easily (i) switch between a DC voltage and an AC voltage and (ii) switch a polarity of an electric charge of the electrode 12 and a polarity of an electric charge of the electrode 22. In other words, it is possible to switch a polarity of a voltage to be applied between the electrodes 12 and 22.

FIG. 2 illustrates the example case in which the power sources to be connected to the electrodes 12 and 22 are switched by the use of the switch 34. Note, however, that the present embodiment is not limited to this. For example, as in Embodiment 4 (later described), the orientation of the flakes can be switched by supplying a control signal with the use of a switching element such as TFT.

Moreover, (a) and (b) of FIG. 1 and FIG. 2 illustrate the case in which the flakes are positively charged. Note, however, that the present embodiment is not limited to this and the flakes can be negatively charged. In such a case, the substrate to which the flakes adhere is opposite to that of the example illustrated in (a) and (b) of FIG. 1.

Figure 3:
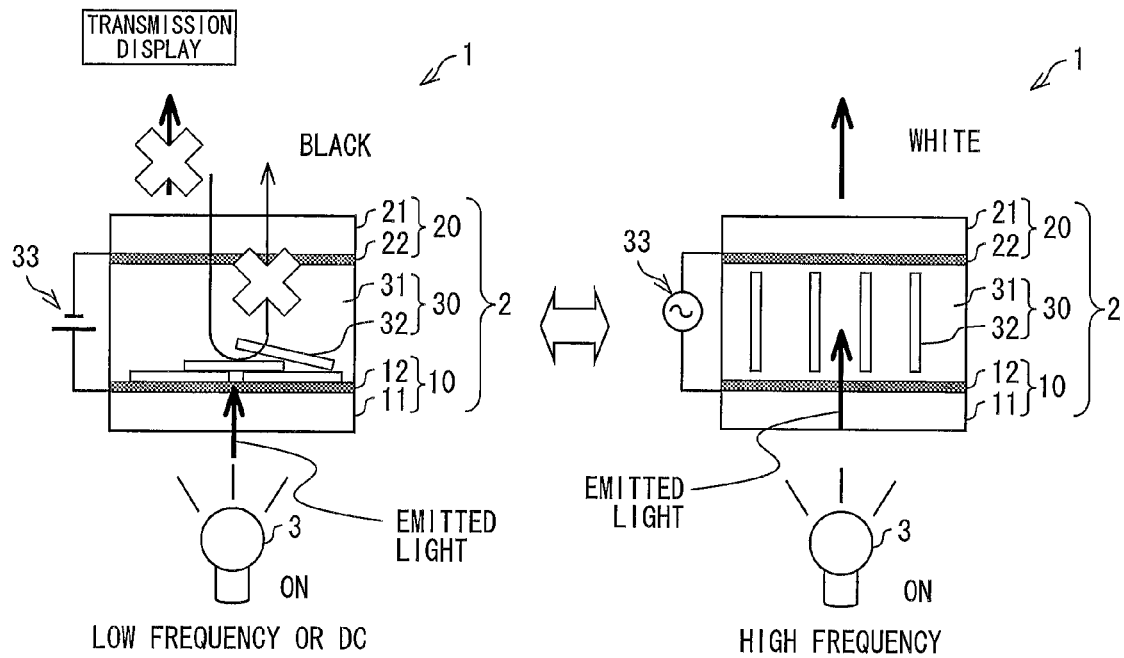
FIG. 3 is a cross-sectional view schematically illustrating, in (a) and (b), another configuration of main parts of a display device, in accordance with Embodiment 1 of the present invention.
Figure 3:
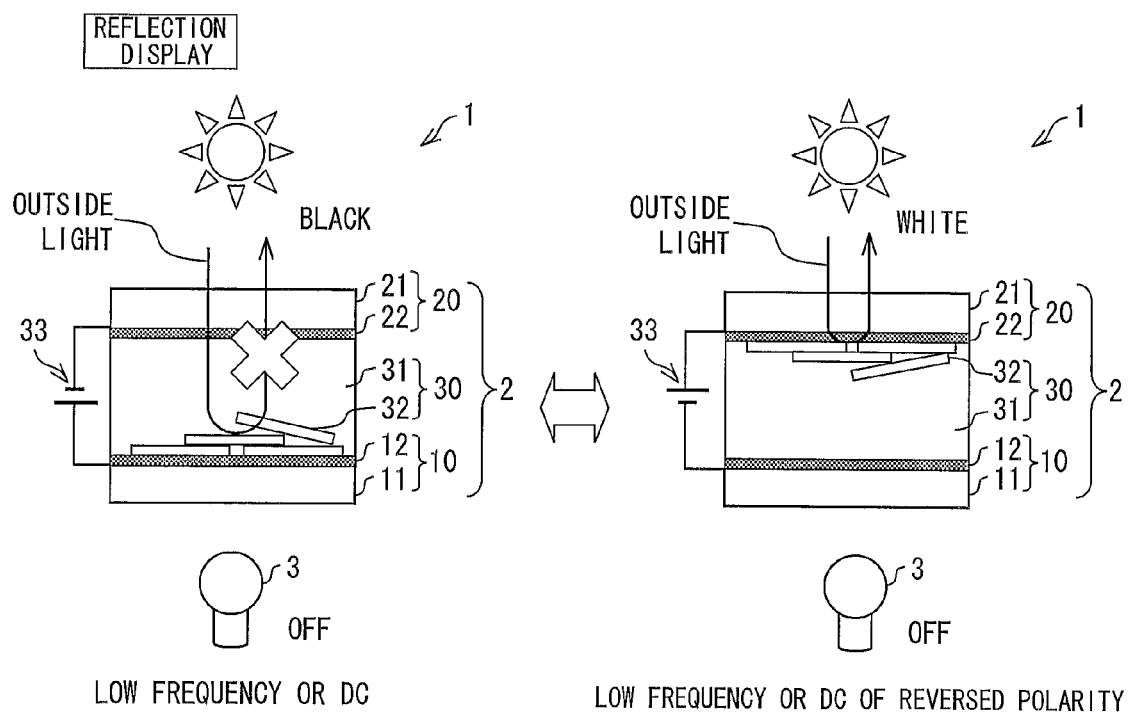

FIG. 3 is a cross-sectional view schematically illustrating, in (a) and (b), a configuration of main parts of the display device 1 in which the flakes are negatively charged. Note that (a) of FIG. 3 is a cross-sectional view illustrating a case in which black display and white display are carried out in the transmission display, and (b) of FIG. 3 is a cross-sectional view illustrating a case in which black display and white display are carried out in the reflection display. Each of right and left parts of each (a) and (b) of FIG. 3 shows a schematic configuration of 1 pixel.

In a case where, for example, (i) the flakes are negatively charged, (ii) a DC voltage is applied between the electrodes 12 and 22, (iii) a negative side of the power source circuit 33 is connected to the electrode 22, and (iv) a positive side of the power source circuit 33 is connected to the electrode 12, the flakes are oriented in such a manner as to adhere to the substrate 10 in which the positively charged electrode 12 is provided, as illustrated in the left part of (a) of FIG. 3 and the left part of (b) of FIG. 3.

Alternatively, in a case where, for example, (i) the flakes are negatively charged, (ii) a DC voltage is applied between the electrodes 12 and 22, (iii) a negative side of the power source circuit 33 is connected to the electrode 12, and (iv) a positive side of the power source circuit 33 is connected to the electrode 22, the flakes are oriented in such a manner as to adhere to the substrate 20 in which the positively charged electrode 22 is provided, as illustrated in the right part of (b) of FIG. 3.

<Display Mode>

The display device 1 in accordance with the present embodiment is a transflective display device and has (i) a reflection display mode in which the display device 1 carries out display by reflecting light entered from outside of the display device 1 (outside light, i.e., ambient light) and (ii) a transmission display mode in which the display device 1 carries out display by causing light from the backlight 3 to pass through. The display device 1 carries out, in a switchable manner, display in the reflection display mode and display in the transmission display mode.

For example, the display device 1 carries out transmission display by utilizing light of a backlight in a relatively dark place such as an indoor space (transmissive mode). Meanwhile, the display device 1 carries out reflection display by utilizing outside light in a relatively bright place such as an outdoor space (reflection mode). This makes it possible to carry out display with a high contrast ratio regardless of brightness of ambient light. This allows the display device 1 to carry out display under any illumination (i.e., light environment) in indoor and outdoor spaces. Under the circumstances, the display device 1 is provided suitably in mobile apparatuses such as a mobile phone, a PDA, and a digital camera.

The following will describe these displays (display modes).

<Transmission Display>

With the display panel 2 including the electrodes 12 and 22 both of which are transparent electrodes, it is possible to achieve transmission display as illustrated in (a) of FIG. 1. With this arrangement, light is blocked when the flakes are oriented in the transverse orientation as illustrated in the left part of (a) of FIG. 1, whereas light passes through when the flakes are oriented in the longitudinal orientation as illustrated in the right part of (a) of FIG. 1.

In the present embodiment, as illustrated in the left part of (a) of FIG. 1, when the flakes are stacked in inclined positions in at least two layers on the substrate 10, multiple reflection is caused, and light is confined within the layers. This cancels light reflected by the flakes, and therefore black is perceived.

Figure 5:
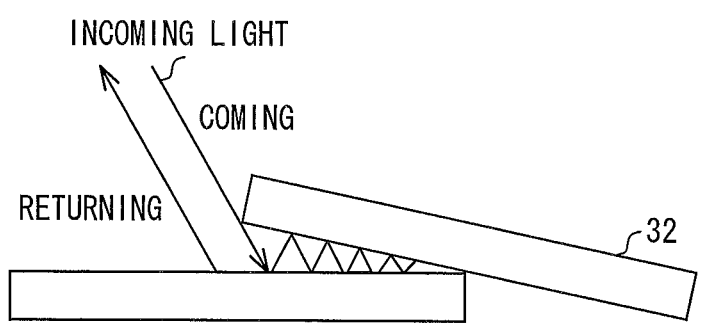
FIG. 5 is a schematic view illustrating a state in which flakes are used as shape-anisotropic members and multiple reflection of outside light, which has entered an optical modulation layer, is caused by the flakes.

FIG. 5 is a schematic view illustrating a state in which flakes are used as the shape-anisotropic members 32 and multiple reflection of outside light, which has entered the optical modulation layer 30, is caused by the flakes.

As illustrated in FIG. 5, light having been directed from a viewer side and then entered the optical modulation layer 30 is repeatedly reflected by the at least two layers of the flakes, during which the reflected light is attenuated and is in turn cancelled.

FIG. 5 illustrates a manner of reflection carried out such that light is reflected ten times in its forward path and ten times in its return path between the flakes with 90% reflectance.

In this case, 100% of incoming light is repeatedly reflected and then returned, as reflected light, to the viewer side at a rate of 12%, which is found by the following equation:

$$(0.9^{\wedge}10)^{\wedge}2 = 12\%.$$

This means that the outside light is hardly reflected toward the viewer side, and therefore contrast is improved. As a matter of course, in a case where the light is confined within the layers, the reflected light is canceled.

Note that in a case where the transmission display is carried out, i.e. in the case where display is carried out in a relatively dark place where the ambient light is insufficiently provided, the side on which the flakes oriented in the transverse orientation are stacked may be any one of a substrate 10 side and a substrate 20 side. In this case, whichever side the flakes are stacked on the substrate 10 side or on the substrate 20 side, light is prevented from passing through, and black display is therefore provided.

However, the arrangement in which the flakes are stacked on the substrate 10 side, which is the rear surface side when viewed from the viewer, is preferable for the reason, as described earlier, that the arrangement causes multiple reflection of light reflected by the reflection surfaces of the flakes and makes the outside light hardly reflected toward the viewer side, and therefore contrast is improved.

On the other hand, with an arrangement in which the backlight 3 is provided on the rear surface side of the display panel 2 and the flakes are oriented in the longitudinal orientation, it is possible to carry out transmission display as with a liquid crystal display.

Further, in a case where the display panel 2 is provided on a non-display surface (e.g., a surface of a body which surface is not an ordinary image display surface) of, for example, a mobile phone, it is possible to display a color of the body of the mobile phone on the non-display surface of the mobile phone by causing the flakes to be oriented in the longitudinal orientation. On the other hand, by causing the flakes to be oriented in the transverse orientation, it is possible to achieve display colored by the flakes on the non-display surface or to reflect the outside light.

Note that, in such a display device 1, the electrodes 12 and 22 can be each configured by a segment electrode or a solid electrode. This makes it possible to simplify the circuit configuration of the display device 1.

<Reflection Display>

According to the present embodiment, even in the arrangement in which the transparent electrodes are used as the electrodes 12 and 22 as described earlier, it is possible to achieve reflection display by changing a location at which the flakes are to be stacked.

That is, when the flakes are stacked on the substrate 10 side, which is the rear surface side when viewed from the viewer, as illustrated in the left part of (b) of FIG. 1, multiple reflection of the outside light is caused by the flakes as illustrated in FIG. 5, and the amount of reflected light is therefore reduced. This makes it possible to achieve black display.

On the other hand, when the flakes are stacked on the substrate 20 side, which is the viewer side, as illustrated in the right part of (b) of FIG. 1, regular reflection of the outside light is caused on the surfaces of the flakes, and therefore reflected light is obtained.

In this manner, in a case where the flakes are adhered to the substrate 20, which is provided on the display surface side, it is ideal for substantially specular display (mirror reflection) that the flakes are viewed in a state where the reflection surfaces of the flakes are all in the same plane (flush with each other). However, the surfaces of the flakes are practically not specular, but have unevenness. Due to the unevenness, scattered light is obtained and therefore appears to be white. Further, the flakes are practically not adhered neatly to the substrate 20, but are adhered to the substrate 20 with some unevenness. For this reason, the incoming light is scattered and therefore appears to be white.

Alternatively, in a case where the flakes are configured by metal pieces, light is reflected by the metal pieces. Further alternatively, in a case where the flakes are configured by colored components, light is colored by the colored flakes.

This makes it possible to realize the display device 1 capable of switching black display (left part of (b) of FIG. 1) and white display (right part of (b) of FIG. 1) in the reflection display.

Note that the backlight 3 is turned ON during the transmission display, while the backlight 3 is turned OFF during the reflection display. Power consumption during the reflection display, in which the backlight 3 is not in operation, is lower than that during the transmission display.

<Effects>

As described above, according to the display device 1 in accordance with the present embodiment, white display and black display can be provided both in the reflection display and in the transmission display.

Figure 15:
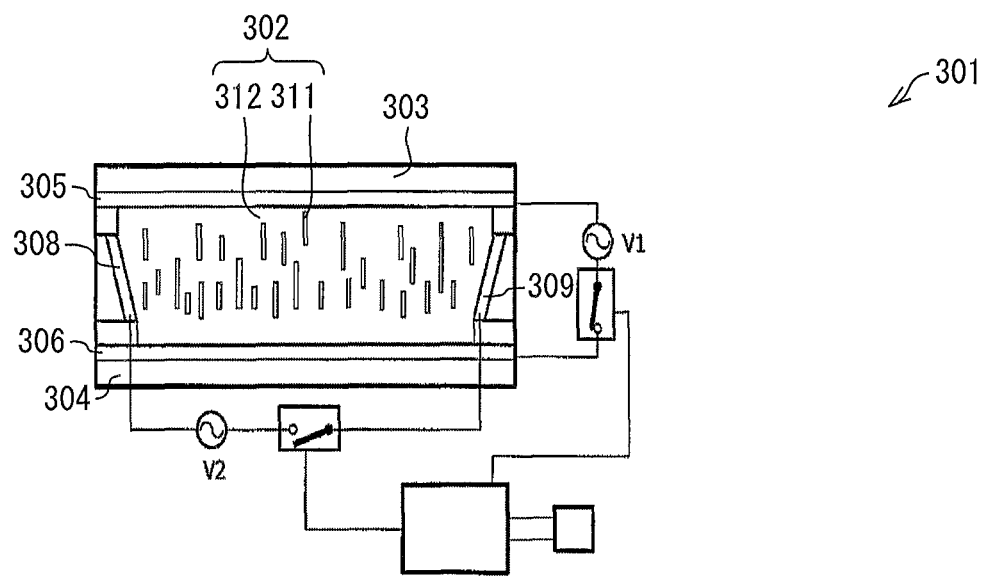
FIG. 15 is a cross-sectional view schematically illustrating, in (a) and (b), a configuration of a suspension particle device used in a transflective and reflective display disclosed in Patent Literature 2.
Figure 15:
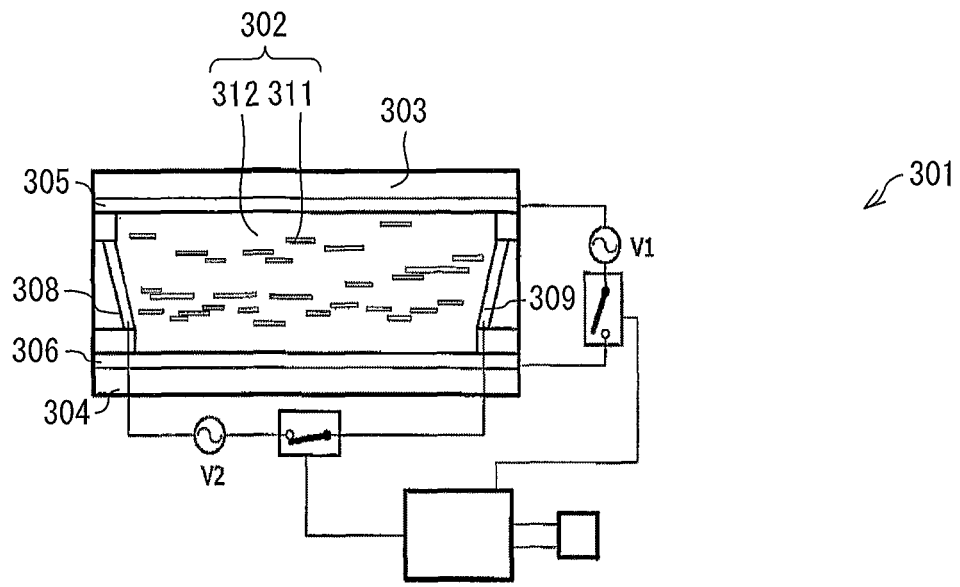

In contrast, Patent Literature 2 discloses that switching between the reflection display mode and the transmission display mode is carried out by switching the orientation of the reflective particles 311 (see (a) and (b) of FIG. 15) between the transverse orientation and the longitudinal orientation. This switching, however, is realized merely by displaying light reflected by the reflective particles 311 in the reflection display mode while displaying light from the backlight in the transmission display mode, as described earlier. This makes it impossible to achieve black display.

If only the reflection display is focused on, black display can be provided by, for example, an arrangement in which a black-colored light absorbing layer is provided on the substrate on the rear surface side when viewed from the viewer, in which state the flakes are oriented in the longitudinal orientation. However, the arrangement in which the light absorbing layer is provided prevents light from the backlight from passing through, thus making it impossible to carry out the transmission display.

As such, in order for the display panel configured to switch the orientations of the flakes between the transverse orientation and the longitudinal orientation to carry out not only the reflection display but also the transmission display and realize black display, the display panel, like the liquid crystal panel, must include the reflection display section used in the reflection mode and the transmission display section used in the transmissive mode.

This configuration prevents a decreased transmittance caused by the polarizing plate, but causes reduction of an aperture ratio by more than half in each of the display modes similarly to the liquid crystal panel. This results in failure in achieving sufficiently bright display.

On the contrary, according to the present embodiment, it is possible to switch the entire one (1) pixel between the transmission display and the reflection display by causing the flakes in the one (1) pixel to change their locations and orientations, as described earlier.

For example, the reflection display, as described earlier, provides black display when the flakes are stacked on the substrate 10 side, which is the rear surface side, and thus causes multiple reflection of light, while providing white display when the flakes are stacked on the substrate 20 side, which is the viewer side.

Meanwhile, the transmission display, which is carried out in a relatively dark place where the ambient light is insufficient, provides black display when the flakes are stacked on the substrate 10 side or on the substrate 20 side and therefore prevents light from passing through, while providing white display when the flakes are oriented longitudinally and therefore causes light to pass through.

As described above, according to the display device 1 in accordance with the present embodiment, it is possible to switch the entire one (1) pixel between the reflection display and the transmission display and to achieve white display and black display both in the reflection display and in the transmission display only by changing the orientations of the flakes, without the need to divide each pixel into sections corresponding to the respective display modes.

Besides, the configuration disclosed in Patent Literature 2 requires, in order to switch the orientation of the reflective particles 311 between the longitudinal orientation and the transverse orientation, (i) the electrodes 305 and 306 between which the electric field V1 is applied so that the reflective particles 311 are oriented in a direction perpendicular to the transparent plate 303 and the insulating substrate 304 and (ii) the electrodes 308 and 309 between which an electric field V2 is applied so that the reflective particles 311 are oriented in a direction parallel to the transparent plate 303 and the insulating substrate 304. Hence, the configuration required by Patent Literature 2 is complicated.

In contrast, according to the display device 1 in accordance with the present embodiment, it is possible to switch the orientation of the flakes between the longitudinal orientation and the transverse orientation by changing the frequency of a voltage to be applied to the electrodes 12 and 22. Consequently, it is possible to provide a transflective display device which has a simple configuration, secures a high light transmittance and a sufficient brightness in display, and can display black.

[Embodiment 2]

Another embodiment of the present invention is described below with reference to (a) and (b) of FIG. 6 through FIG. 8.

In the following, the differences between the present embodiment and Embodiment 1 are mainly described, and those constituent elements having the same functions as those of the constituent elements described in Embodiment 1 are given the same reference signs, and as such, are not described below.

<Schematic Configuration of Display Device>

Figure 6:
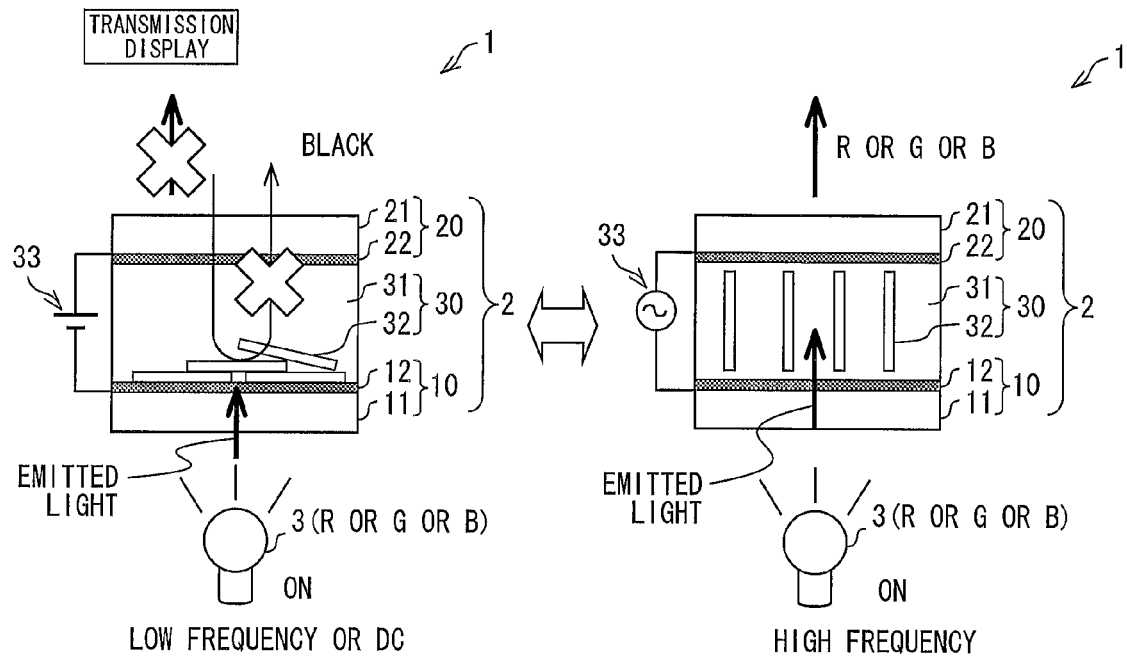
FIG. 6 is a cross-sectional view schematically illustrating, in (a) and (b), a configuration of main parts of a display device, in accordance with Embodiment 2 of the present invention.
Figure 6:
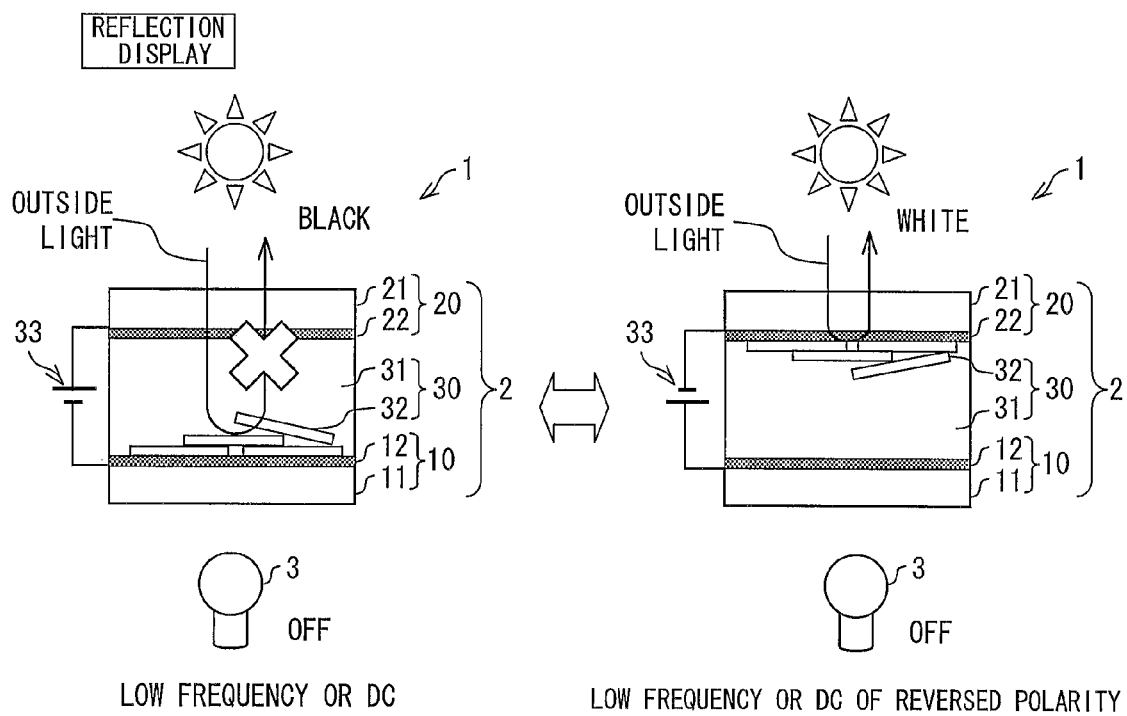
Figure 7:
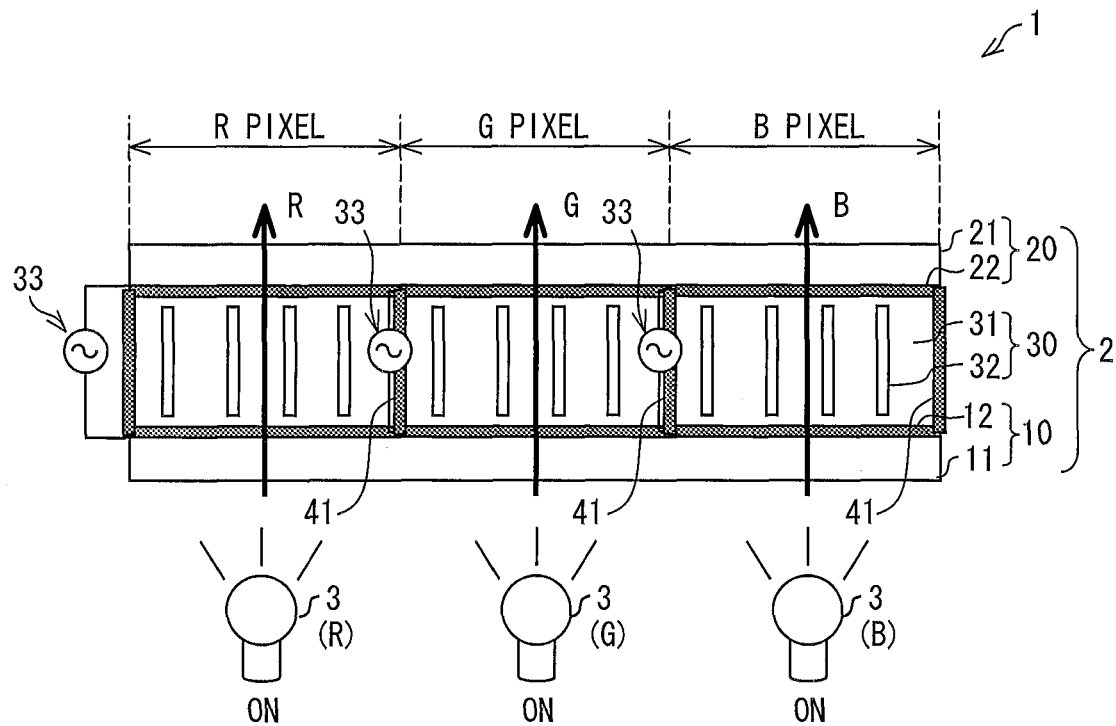
FIG. 7 is another cross-sectional view schematically illustrating a configuration of main parts of a display device, in accordance with Embodiment 2 of the present invention.

(a) and (b) of FIG. 6 and FIG. 7 are each a cross-sectional view schematically illustrating a configuration of main parts of a display device 1 in accordance with the present embodiment.

(a) of FIG. 6 is a cross-sectional view of the display device 1 which is displaying black and displaying R (red), G (green), and B (blue) in a case where transmission display is carried out. (b) of FIG. 6 is a cross-sectional view of the display device 1 which is displaying black and displaying white in a case where reflection display is carried out. The right and left parts of (a) and (b) of FIG. 7 each schematically show a configuration of a single pixel. FIG. 7 schematically shows a configuration of three pixels, namely an R (red) pixel, a G (green) pixel, and a B (blue) pixel.

As illustrated in (a) and (b) of FIG. 6, the basic configuration of the display device 1 of the present embodiment is the same as that of the display device 1 of Embodiment 1.

The display device 1 of the present embodiment is different from the display device 1 of Embodiment 1 in that a backlight 3 is a backlight configured to emit light whose color is R, G, or B.

In the display device 1 of the present embodiment, backlights 3 which emit light of respective colors R, G, and B are provided in a manner, for example, that are fixedly disposed for respective pixels.

These backlights 3 of different colors R, G, and G are disposed in an order, as illustrated in FIG. 7, for the individual pixels of different colors R, G, and G, respectively, and emit light continuously during the transmission display.

In the display device 1 configured as above, partitions 41, such as ribs, to prevent mixture of colors of adjacent pixels may be provided in a stripe pattern in such a manner that each of the partitions 41 is provided in between the pixels of different colors, as illustrated in FIG. 7. That is, (a) and (b) of FIG. 6 illustrates, as an example, a case where the display panel 2 used is the same as the display panel 2 illustrated in (a) and (b) of FIG. 1, and the partitions 41 may be provided in the display panel 2 illustrated in (a) and (b) of FIG. 6.

This makes it possible to prevent mixture of colors of adjacent pixels and to prevent the flakes from being unevenly distributed by movement of the flakes, and the like.

Note that the partitions 41 may be each made from any material and have any size, without any particular limitation, provided that the partitions 41 are able to prevent mixture of colors of adjacent pixels.

The partitions 41 may also serve as spacers for holding a given spacing (cell gap) between the substrates 10 and 20. The partitions 41 can be formed, for example, by using a material and a method both of which are similar to those used to form a typical columnar spacer.

Next, a display method that involves the use of the display device 1 is described. It should be noted that the following description also deals with a case where the shape-anisotropic members 32 are flakes.

<Transmission Display>

In a case where the display device 1 configured as above is used and, for example, the display device 1 is to be used in full color, the display device 1 is operated in the transmission display. For example, assuming that the display device 1 of the present embodiment is used as a display of an electronic book to show a content (such as a magazine) which needs to be shown in full color, the display device 1 is operated in the transmission display.

In this case, when any of the backlights 3 of R, G, and B provided under the corresponding pixels emits light while flakes are oriented in the longitudinal orientation as illustrated in the right part of (a) of FIG. 6 and FIG. 7, a color of the light emitted from that backlight 3 is perceived.

Meanwhile, while the flakes are oriented in the transverse orientation as illustrated in the left part of (a) of FIG. 6, light from the backlight 3 does not pass through as described in Embodiment 1, and accordingly black is perceived. This makes it possible to carry out full-color display.

Further, as with Embodiment 1, the display device 1 is operated in the transmission display even in a dark place where the outside light is absent.

<Reflection Display>

Meanwhile, in a case where the display device 1 is to be used with low power consumption, the display device 1 is operated in reflection display. The following also takes, as an example, the case where the display device 1 of the present embodiment is used as a display of an electronic book.

In such a case, for example, in order to show a monochrome content (such as a newspaper) at a visiting place while suppressing power consumption, the display device 1 is operated in the reflection display.

In this case, when the flakes in the transverse orientation are stacked on a lower side (on a side of the substrate 10 provided on the rear surface side) as illustrated in the left part of (b) of FIG. 6, multiple reflection of the outside light is caused by the flakes as described in Embodiment 1, and therefore black is perceived.

On the contrary, when the flakes are stacked on an upper side (on a side of the substrate 20 provided on the display surface side) as illustrated in the right part of (b) of FIG. 6, regular reflection of the outside light is caused on the surfaces of the flakes as described in Embodiment 1, and therefore white is perceived.

In either case, power consumption during the reflection display, in which the backlight 3 is not in operation, is lower than that during the transmission display. Hence, monochrome display can be carried out with low power consumption.

As described above, according to the present embodiment, in order to carry out color display, the flakes are oriented in the longitudinal orientation so that light entering the optical modulation layer 30 from the backlight 3 reaches a viewer. With this configuration, color display can be carried out without providing a color filter. This makes it possible to carry out monochrome display with low power consumption and to suppress loss of light by a color filter in carrying out color display. It is therefore possible to reduce the power consumption of the backlight 3.

In this manner, according to the present embodiment, it is possible to provide the display device 1 capable of switching color display and monochrome display.

<Modification 1>

FIG. 7 illustrates, as an example, the case where the backlights 3 of R, G, and B are fixedly disposed for respective pixels. Note, however, that the present embodiment is not limited to this.

Figure 8:
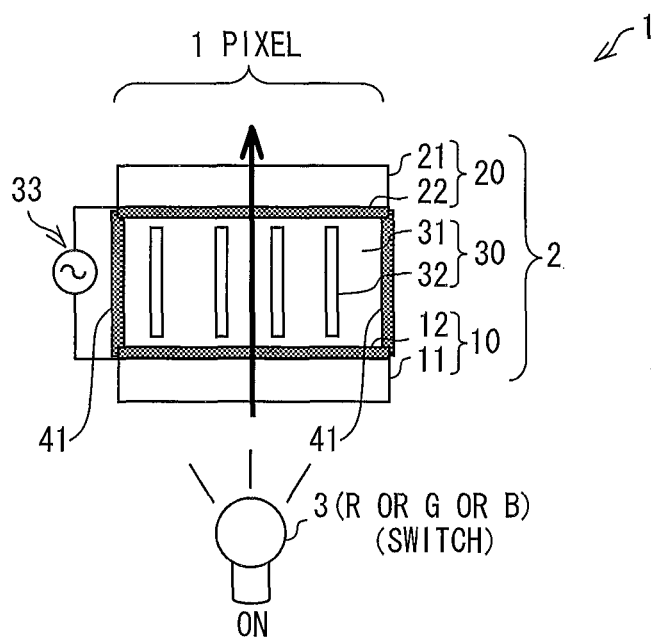
FIG. 8 is still another cross-sectional view schematically illustrating a configuration of main parts of a display device, in accordance with Embodiment 2 of the present invention.

FIG. 8 is still another cross-sectional view schematically illustrating a configuration of main parts of a display device 1, in accordance with the present embodiment.

The display device 1 illustrated in FIG. 8 includes a backlight 3 capable of switching colors of emitted light for each pixel.

In this manner, by switching the color of light emitted from the backlight 3 for each of pixels of R, G, and B, it is possible to carry out display similarly to the display device 1 illustrated in FIG. 7.

Further, in the case where the color of the light emitted from the backlight 3 is switched to R, G, or B for each pixel as described above, the color of the light emitted from the backlight 3 can be arbitrarily switched in an arbitrary area in accordance with an image signal inputted to the display device 1.

In the present modification as well, while the backlight 3 is not in operation, i.e., during the reflection display, the backlight 3 may be turned off for each pixel, from the viewpoint of reduction in power consumption.

<Modification 2>

The present embodiment and Modification 1 have described, as an example, the case where the backlight 3 (light source of the backlight 3) is provided for each pixel. However, the present embodiment and Modification 1 are not limited to this. Alternatively, backlights 3 (light sources of the backlights 3) may be provided for respective areas each of which corresponds to a plurality of pixels for displaying the same color.

In this case, partitions 41 for preventing mixture of colors of light entering from the areas adjacent to each other are provided for each of the areas.

[Embodiment 3]

Still another embodiment of the present invention is described below with reference to (a) and (b) of FIG. 9 and FIG. 10.

In the following, the differences between the present embodiment and Embodiments 1 and 2 are mainly described, and those constituent elements having the same functions as those of the constituent elements described in Embodiments 1 and 2 are given the same reference signs, and as such, are not described below.

<Schematic Configuration of Display Device>

Figure 9:
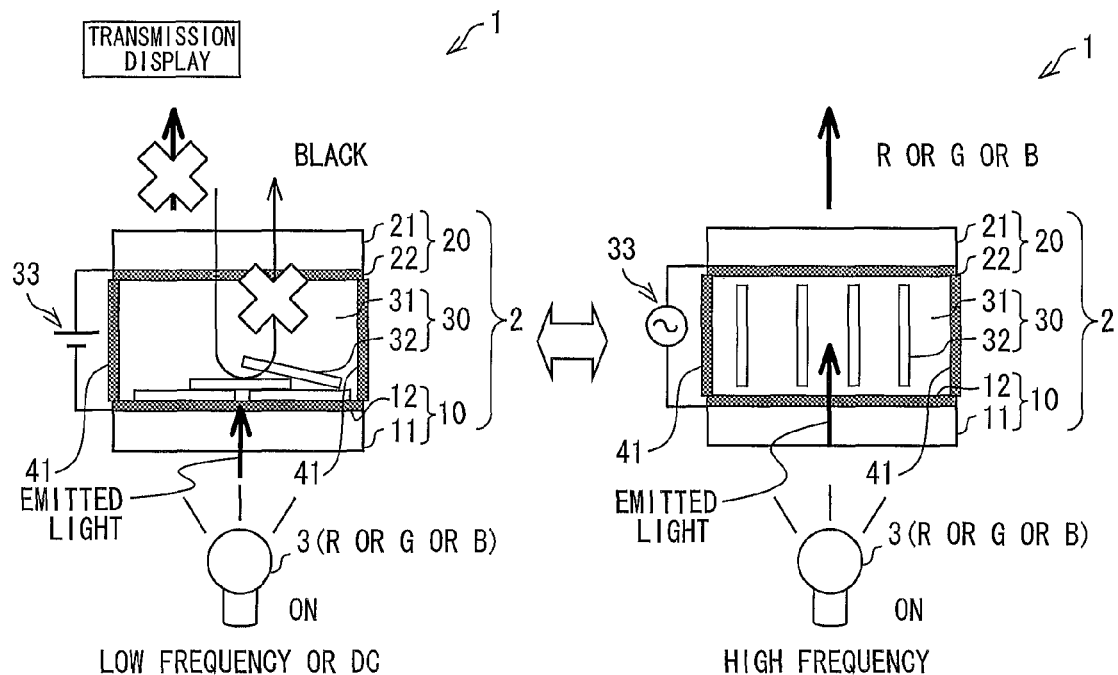
FIG. 9 is a cross-sectional view schematically illustrating, in (a) and (b), a configuration of main parts of a display device, in accordance with Embodiment 3 of the present invention.
Figure 9:
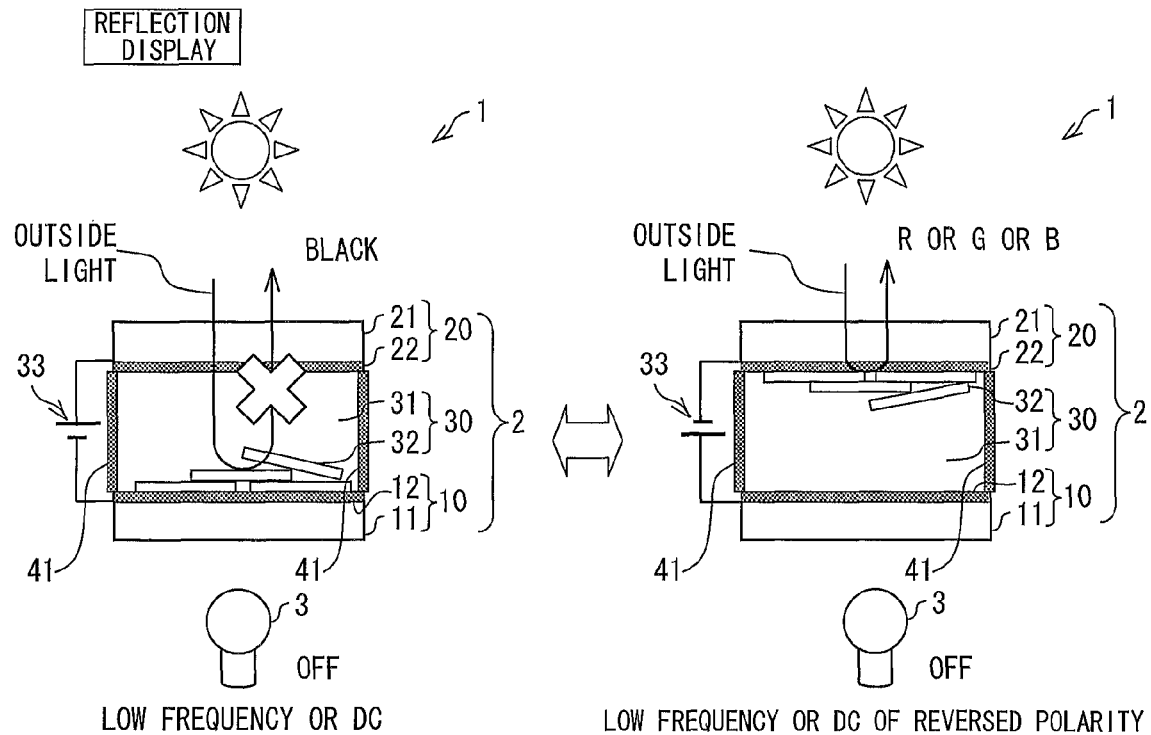

(a) and (b) of FIG. 9 and FIG. 9 are each a cross-sectional view schematically illustrating a configuration of main parts of a display device 1 in accordance with the present embodiment.

(a) of FIG. 9 is a cross-sectional view of the display device 1 displaying black and displaying R (red), G (green), and B (blue) in a case where transmission display is carried out. (b) of FIG. 9 is a cross-sectional view of the display device 1 displaying black and displaying R (red), G (green), and B (blue) in a case where reflection display is carried out. The right and left parts of (a) and (b) of FIG. 9 each schematically shows a configuration of a single pixel. FIG. 10 schematically shows a configuration of three pixels, namely an R (red) pixel, a G (green) pixel, and a B (blue) pixel.

As illustrated in (a) and (b) of FIG. 9, the basic configuration of the display device 1 of the present embodiment is the same as, for example, that of the display device 1 of Embodiment 2.

The display device 1 in accordance with the present embodiment differs from a display device 1 of Embodiment 2 in that the shape-anisotropic members 32 have colored surfaces (reflection surfaces).

<Shape-anisotropic Member 32>

As described above, the shape-anisotropic members for use in the present embodiment have colored surfaces. It should be noted that the surface of each of the shape-anisotropic members 32 may be (i) colored by providing a pigment-containing resin, an interference film, or the like thereon, (ii) colored by forming the shape-anisotropic member 32 from a colored member, or (iii) formed by a dielectric multilayer film, a cholesteric resin, or the like.

Alternatively, it is possible to use a method, for example, in which mixtures of shape-anisotropic members 32 and a medium 31 are applied in different colors by ink jetting.

In the present embodiment, each of the shape-anisotropic members 32 is colored in red, green, or blue for each pixel. Therefore, the shape-anisotropic members 32 in accordance with the present embodiment are configured to include at least shape-anisotropic members colored in red, shape-anisotropic members colored in green, and shape-anisotropic members colored in blue.

<Partition 41>

Figure 10:
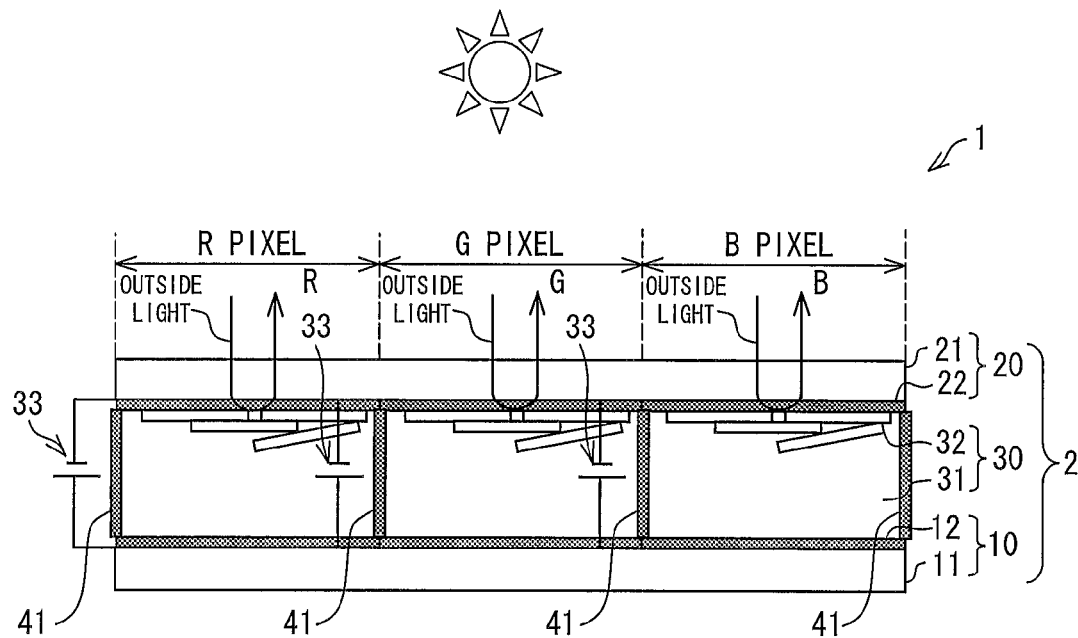
FIG. 10 is another cross-sectional view schematically illustrating a configuration of main parts of a display device, in accordance with Embodiment 3 of the present invention.

Further, it is preferable that the display device 1 is configured such that partitions 41 such as those described in Embodiment 2 are each provided between pixels of different colors, as illustrated in (a) and (b) of FIG. 9 and FIG. 10.

This makes it possible to prevent mixture of colors of transmitted light from the backlight 3 and to prevent shape-anisotropic members 32 of different colors from moving and being unevenly distributed, and it is therefore possible to carry out satisfactory color display.

Next, a display method that involves the use of the display device 1 is described. It should be noted that the following description also deals with a case where the shape-anisotropic members 32 are flakes.

<Transmission Display>

In the present embodiment, the operation of the display device 1 during transmission display is the same as that described in Embodiment 2. As such, the operation of the display device 1 during transmission display is not described in the present embodiment.

In the present embodiment also, the backlight 3 may be configured such that backlights 3 of different colors (e.g. R, G, and B) are fixedly disposed for respective pixels as illustrated in FIG. 7 or that the color of light emitted from a backlight 3 for each pixel is switched, for example, between R, G, and B as illustrated in FIG. 8.

Incoming light having entered an optical modulation layer 30 from a backlight 3 passes directly through the optical modulation layer 30 or, after being reflected by the reflection surfaces of the flakes, passes through toward the display surface, which is on the side opposite to the side from which the incoming light has entered.

In either case, it is preferable that the color of the surfaces of the shape-anisotropic members 32 in each of the regions partitioned from one another by the partitions 41 is identical with the color of light that is emitted from the corresponding backlight 3. This makes it possible to cause a color of light, which has entered the optical modulation layer 30 from the backlight 3 and passes directly through the optical modulation layer 30, to be identical with a color of light which has entered the optical modulation layer 30 from the backlight 3 and travels toward the display surface after being reflected by the reflection surfaces of the flakes. It is therefore possible to carry out satisfactory color display.

<Reflection Display>

In a case where the display device 1 is to be used with low power consumption and in full color, reflection display is carried out by the display device 1 using colored flakes, as in the display device 1 of the present embodiment.

In this case, when the flakes in the transverse orientation are stacked on a lower side (on a side of the substrate 10 provided on the rear surface side) as illustrated in the left part of (b) of FIG. 9, multiple reflection of outside light is caused by the flakes as described in Embodiment 1, and therefore black is perceived.

On the other hand, when the flakes are stacked on an upper side (on a side of the substrate 20 provided on the display surface side) as illustrated in the left part of (b) of FIG. 9, regular reflection of outside light is caused on the surfaces of the flakes, and therefore reflected light from the flakes is obtained. Since the surfaces of the flakes are colored, display colored by the flakes can be carried out.

As described above, it is possible in Embodiment 2 to carry out color display (full-color display) only by the transmission display. Meanwhile it is possible in the present embodiment to carry out color display (full-color display) also by the reflection display with the use of flakes having colored surfaces.

Further, according to the present embodiment, the backlight 3 is not used during the reflection display, and therefore power consumption during the reflection display is lower than that during the transmission display. This makes it possible to carry out color display with low power consumption without using the backlight 3 during the reflection display.

Further, according to the present embodiment, as described above, color display can be carried out without providing a color filter, regardless of whether the transmission display or the reflection display. This makes it possible to suppress loss of light by a color filter in carrying out color display, and it is therefore possible to reduce the power consumption of the backlight 3 in either case.

<Modification 1>

In (a) and (b) of FIG. 9, the present embodiment has been described, as with Embodiment 2, the example case where the backlight 3 used is a backlight that emits light whose color is R, G, or B. However, the present embodiment is not limited to this example. As described in Embodiment 1, the backlight 3 used may have, as a light source, an LED (white light-emitting element) that emits white light.

In this case, as described above, black or color display is carried out during the reflection display as illustrated in (b) of FIG. 9 and FIG. 10, and black or white display is carried out during the transmission display as illustrated in (a) of FIG. 1.

For this reason, the present modification makes it possible to carry out color display in a case where display of a reflective type is carried out and to carrying out monochrome display in a dark environment with low viewability so as to carry out display with emphasis of lightness.

<Modification 2>

Further, the present embodiment has been described by taking, as an example, a case where the shape-anisotropic members 32 are configured to include the shape-anisotropic members colored in red, the shape-anisotropic members colored in green, and the shape-anisotropic members colored in blue.

However, the present embodiment is not limited to this example. The shape-anisotropic members 32 may be configured to include at least some of shape-anisotropic members colored in cyan (C), shape-anisotropic members colored in magenta (M), and shape-anisotropic members colored in yellow (Y) instead of or in addition to the shape-anisotropic members colored in red, the shape-anisotropic members colored in green, and the shape-anisotropic members colored in blue.

[Embodiment 4]

Still another embodiment of the present invention is described below with reference to FIGS. 11 and 12.

In the following, the differences between the present embodiment and Embodiments 1 through 3 are mainly described, and those constituent elements having the same functions as those of the constituent elements described in Embodiments 1 through 3 are given the same reference signs, and as such, are not described below.

<Schematic Configuration of Display Device>

Figure 11:
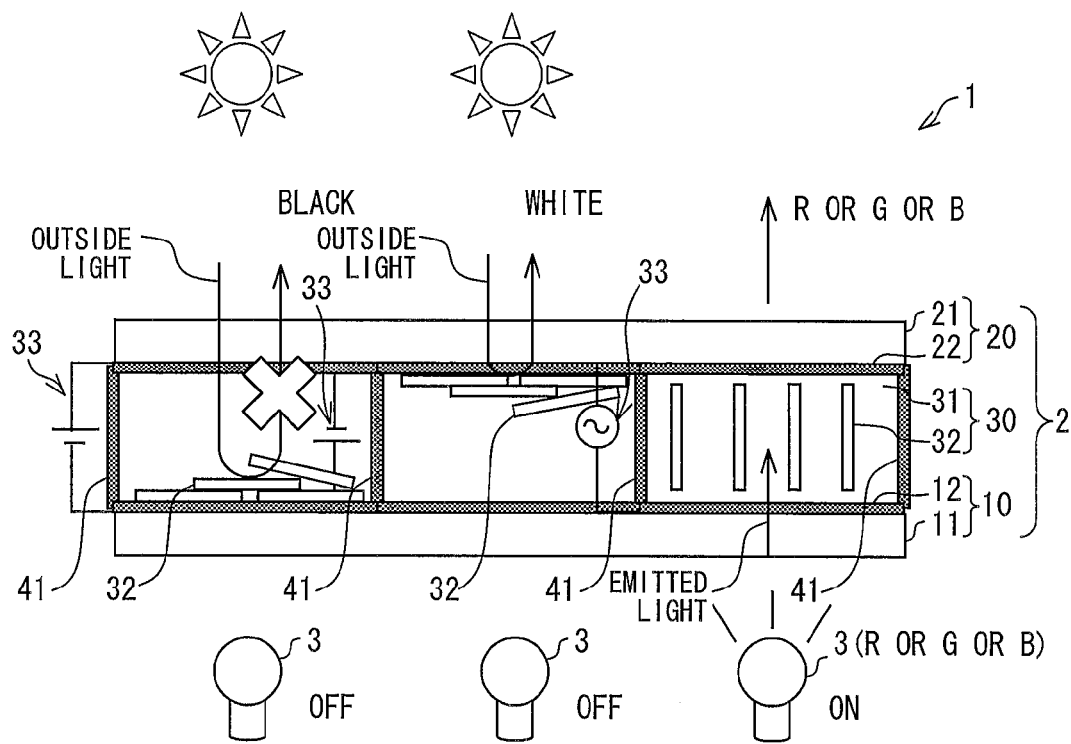
FIG. 11 is a cross-sectional view schematically illustrating a configuration of main parts of a display device, in accordance with Embodiment 4 of the present invention.

FIG. 11 is a cross-sectional view schematically illustrating a configuration of main parts of a display device in accordance with the present embodiment.

As illustrated in FIG. 11, the basic configuration of the display device 1 of the present embodiment is the same as that of the display device 1 of any one of Embodiments 1 through 3.

The display device 1 of the present embodiment differs from the display device 1 of any one of Embodiments 1 through 3 in that reflection display and transmission display are simultaneously carried out.

It should be noted that FIG. 11 illustrates, as an example, a case where the reflection display and the transmission display are simultaneously carried out by the display device 1 of Embodiment 2.

<Display Method>

A display method that involves the use of the display device 1 is described below. The following description also deals with a case where the shape-anisotropic members 32 are flakes.

The display device 1 illustrated in FIG. 11 is suitable for a case where fine full-color display is to be carried out with low power consumption.

In Embodiment 3, full-color display can be carried out not only by the transmission display but also by the reflection display. However, the full-color display by the reflection display is inferior in performance to the full-color display by the transmission display.

Under the circumstances, in the present embodiment, the reflection display is carried out in a monochrome part and the transmission display is carried out in an RGB part.

For this purpose, in the present embodiment, the reflection display and the transmission display are simultaneously carried out by area active driving with the use of point light sources such as LEDs as the light sources of the backlight 3, for example, for each pixel or for each color of pixels.

In this case, the backlight 3 is turned off in the monochrome part, and the backlight 3 is turned on in the RGB part. This makes it possible to carry out fine full-color display while suppressing power consumption.

In the present embodiment also, the backlight 3 may be configured such that backlights 3 of different colors (e.g. R, G, and B) are fixedly disposed for respective pixel as illustrated in FIG. 7 or that the color of light emitted from a backlight 3 for each pixel is switched, for example, between R, G, and B as illustrated in FIG. 8.

<Driving Method>

A method for driving the display device 1 of the present embodiment is described below. The following description takes, as an example, a case where the shape-anisotropic members 32 are flakes, the light sources of the backlight 3 are LEDs, and the switching elements of the display panel 2 are TFTs.

Figure 12:
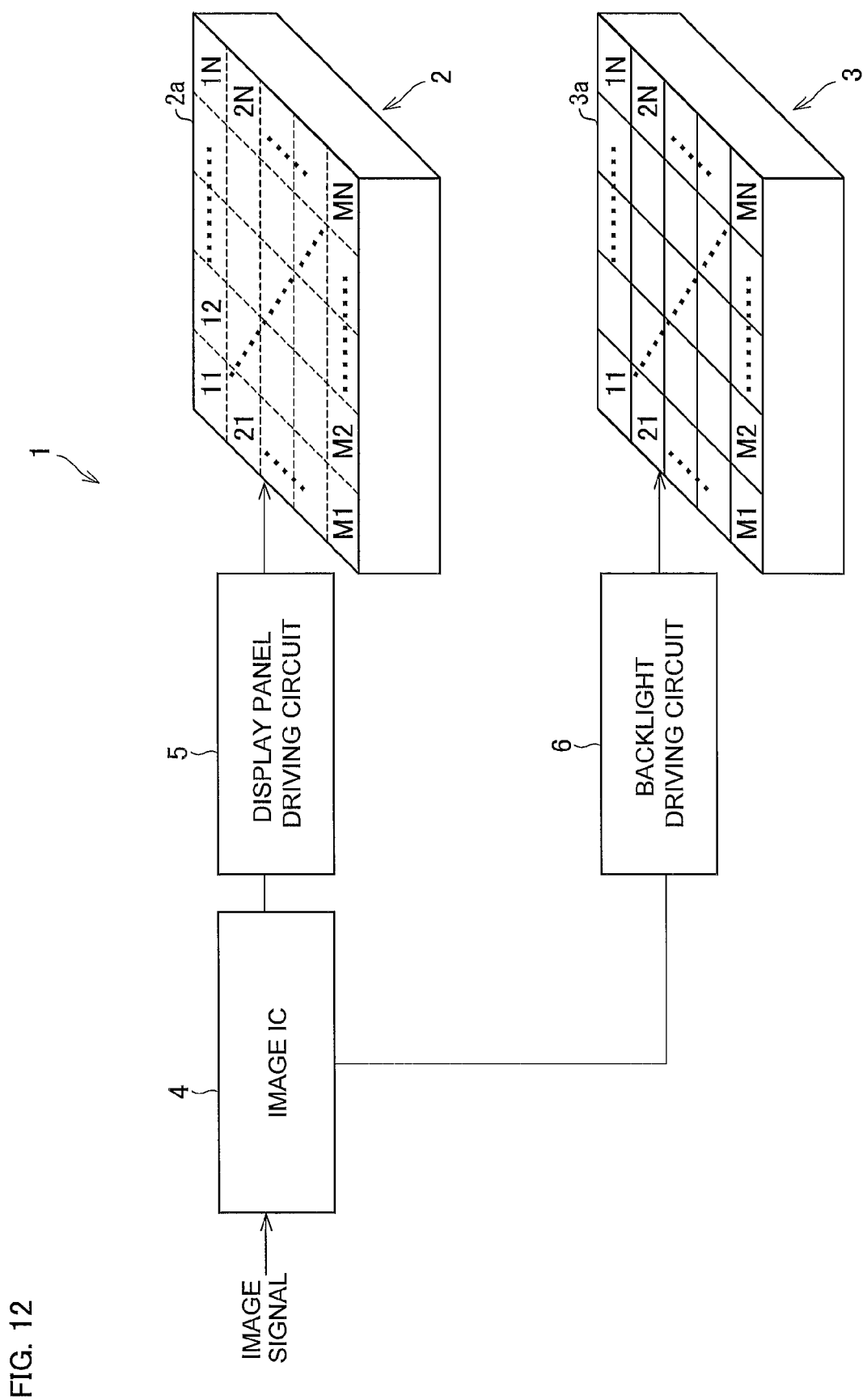
FIG. 12 is a block diagram schematically illustrating a configuration of main parts of a display device, in accordance with Embodiment 4 of the present invention.

FIG. 12 is a block diagram schematically illustrating a configuration of main parts of the display device 1 in accordance with the present embodiment.

As illustrated in FIG. 12, the display device 1 of the present embodiment includes a display panel 2, a backlight 3, an image IC (integrated circuit) 4, a display panel driving circuit 5, and a backlight driving circuit 6.

When an image signal is inputted to the display device 1, an area active process is carried out in accordance with this image signal (input image).

In this case, the image IC 4 (i) discriminates white, black, R, G, and B in a luminance signal and a color signal that are contained in the image signal sent to the image IC 4 and (ii) transmits control signals to the display panel driving circuit 5 and the backlight driving circuit 6, respectively, so as to change the orientation of the flakes and switching on and off of the LEDs.

In accordance with the control signals which are based on the image signal and supplied to the TFTs of the respective pixels, the display panel driving circuit 5 switches (i) the frequency of a voltage that is applied between the electrodes 12 and 22 corresponding to each of the pixels and (ii) the polarity of electric charge of the electrodes 12 and 22.

In accordance with the control signals (lighting control signals) which are based on the image signal and supplied to the respective LEDs, the backlight driving circuit 6 turns on or off the LEDs separately with respect to the input image by turning on or off the LEDs in accordance with whether monochrome display or color display is carried out.

The backlight 3 has a light emission surface which is partitioned into divisional lighting areas 3a (light-emitting sections) arranged in a matrix manner, e.g. in M rows and N columns, and the divisional lighting areas 3a are independently turned on or off. That is, in the present embodiment, an area-divided light guide plate, such as a tandem light guide plate, is used as a light guide plate in the backlight 3 so as to turn on or off the LEDs for each area (i.e. each divisional lighting area 3a).

Meanwhile, the display panel 2 can be virtually partitioned into divisional display areas 2a which correspond to the respective divisional lighting areas 3a of the backlight 3. It should be noted that each of the divisional lighting areas 3a and the divisional display areas 2a preferably corresponds to an integral multiple (i.e., one or more times) of one (1) pixel in the display panel 2, and as described above, the divisional lighting areas 3a and the divisional display areas 2a are partitioned, for example, for respective pixels or for respective colors of pixels.

In this case, each of the partitions 41 needs only to be provided in the optical modulation layer 30 in a location which corresponds to a boundary between adjacent two of the divisional lighting areas 3a of the backlight 3 (i.e. a location between adjacent pixels or between adjacent regions each of which corresponds to a plurality of pixels for the same color), when viewed in a direction perpendicular to the substrates 10 and 20.

For convenience of explanation, FIG. 12 illustrates the backlight driving circuit 6 separately from the backlight 3 as one of driving circuits. However, the backlight driving circuit 6 may be provided separately from or integrally with the backlight 3.

The display device 1 is configured such that, in a case where monochrome display is carried out, the display panel driving circuit 5 sends, to the TFT of a certain pixel (divisional display area 2a) of the display panel 2, a control signal for causing the flakes to be transversely orientated, and simultaneously, the backlight driving circuit 6 sends, to an LED placed under the certain pixel (divisional display area 2a) (i.e. to an LED placed in the divisional lighting area 3a corresponding to the divisional display area 2a), a control signal for turning off the LED.

Meanwhile, the display device 1 is configured such that, in a case where RGB display is carried out, the display panel driving circuit 5 sends, to the TFT of a certain pixel (divisional display area 2a) of the display panel 2, a control signal for causing the flakes to be longitudinally orientated, and simultaneously, the backlight driving circuit 6 sends, to an LED placed under the certain pixel (divisional display area 2a) (i.e. to an LED placed in the divisional lighting area 3a corresponding to the divisional display area 2a), a control signal for turning on the LED.

This is how the present embodiment makes it possible to simultaneously carry out the reflection display and the transmission display.

In such a case of changing orientation by sending a control signal to a TFT, e.g. in a case of switching from the longitudinal orientation (AC) to the transverse orientation (DC), it is possible to substantially switch between AC and DC (i.e., to adjust a magnitude relationship between a DC component and an AC component) by applying an offset voltage, preferably an offset voltage that is lower than the highest voltage applied on AC, to the opposed electrode (common electrode 22) and thereby changing the strength (amplitude) of the voltage that is applied on AC. Further, in a case of switching the positions of the flakes between the substrate 20 (upper substrate) and the substrate 10 (lower substrate) while keeping the flakes in the transverse orientation (i.e. switching between black and white), it is possible to substantially switch the polarity of DC by reversing the polarity of the offset voltage.

<Modification>

The present embodiment has been described by taking, as an example, a case where the display device 1 of Embodiment 2 simultaneously carries out the reflection display and the transmission display. However, the present embodiment is not limited to this example. In the present embodiment, the display device 1 of any of Embodiments 1 and 3 or any of the modifications described above may simultaneously carry out the reflection display and the transmission display by area active driving.

For example, in the display device 1 illustrated in FIG. 11, fine full-color display is achieved with low power consumption by carrying out (i) the reflection display in the monochrome part and (ii) the transmission display in the RGB part instead of carrying out full-color display by the reflection display, which is inferior in performance to full-color display by the transmission display. However, power consumption may be reduced as much as possible by configuring the display device 1 of either of the modifications of Embodiment 3 to simultaneously carry out the reflection display and the transmission display.

In this case, full-color display can be carried out with emphasis on low power consumption by carrying out the reflection display in a black part and a color part (e.g. an RGB part) as illustrated in the right and left parts of (b) of FIG. 9 and carrying out the transmission display in a white part as illustrated in the right part of (a) of FIG. 1.

However, in a case where the display device 1 of Embodiment 2 simultaneously carries out the reflection display and the transmission display, e.g. in a case where the color of light that is emitted by the backlight 3 in one (1) divisional lighting area 3a (e.g. one (1) pixel) is switched between R, G, and B in accordance with an image signal inputted to the display device 1, the color of light that is emitted by the backlight 3 can be arbitrarily switched in accordance with the image signal inputted to the display device 1.

[Embodiment 5]

Still another embodiment of the present invention is described below with reference to FIG. 13.

In the following, the differences between the present embodiment and Embodiments 1 through 4 are mainly described, and those constituent elements having the same functions as those of the constituent elements described in Embodiments 1 through 4 are given the same reference signs, and as such, are not described below.

<Schematic Configuration of Display Device>

Figure 13:
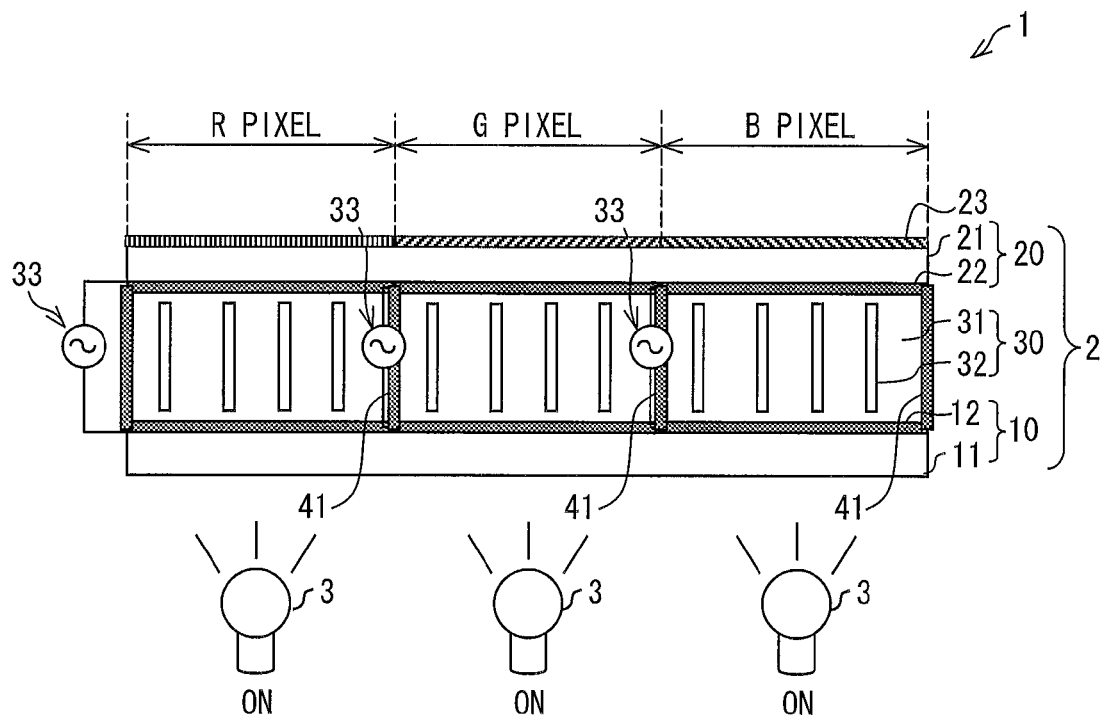
FIG. 13 is a cross-sectional view schematically illustrating a configuration of main parts of a display device, in accordance with Embodiment 5 of the present invention.
Figure 14:
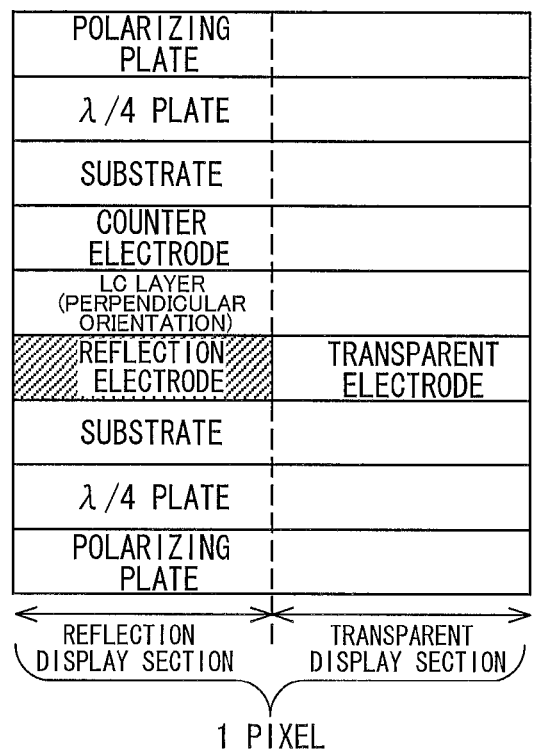
FIG. 14 is a cross-sectional view schematically illustrating a configuration of a liquid crystal panel of a liquid crystal display device disclosed in Patent Literature 1.

FIG. 13 is a cross-sectional view schematically illustrating a configuration of main parts of a display device 1 in accordance with the present embodiment.

As illustrated in FIG. 13, the basic configuration of the display device 1 of the present embodiment is the same as that of the display device 1 of any of Embodiments 1 through 4.

The display device 1 of the present embodiment differs from the display device 1 of any of Embodiments 1 through 4 in that full-color display is carried out by providing color filters 23 of R, G, and B.

The use of the color filter 23 makes it possible to carry out fine full-color display with a simple configuration, regardless of (i) whether or not the shape-anisotropic members 32 are colored or (ii) whether or not to use light sources that emit light whose colors are R, G, and B.

It should be noted that the configuration of the present embodiment can be applied to any of the configurations of Embodiments 1 through 4 and the modifications thereof.

Therefore, the descriptions of Embodiments 1 through 4 are applicable to the example of FIG. 13 in which the flakes are longitudinally oriented during the transmission display, except that the color filters 23 of R, G, and B are provided in the respective pixels. Note, however, that, in a case where the color of light that is emitted by the backlight 3 in one (1) divisional lighting area 3a (e.g. one (1) pixel) is switched between R, G, and B, no color filter 23 can be provided.

The colors of R, G, and B of the backlight 3 need to be combined with the same colors of R, G, and B of the color filters 23. Further, in a case where the shape-anisotropic members 32 (flakes) have colored surfaces, the colors of R, G, and B of the backlight 3, the colors of R, G, and B of the color filters 23, and the colors the shape-anisotropic members 32 (flakes) need to be matched.

FIG. 13 illustrates, as an example, a case where the color filters 23 are provided on the display surface side of the substrate 20 (i.e. on the surface of the substrate 20 opposite to the optical modulation layer 30). However, the location of the color filters 23 is not limited to this example. For example, the color filters 23 may be provided (i) between the insulating substrate 21 and the electrode 22 in the substrate 20, (ii) on a surface of the substrate 20 which surface faces the optical modulation layer 30, or (iii) on the side of the substrate 10, depending on whether to (i) carry out color display by the transmission display or (ii) carry out color display by the reflection display.

However, providing the color filters 23 on the display surface side of the substrate 20 makes it possible to inhibit a parallax from being generated between the optical modulation layer 30 and the color filter 23 in a case where color display is carried out by orienting the flakes on the side of substrate 20. It is therefore possible to achieve color display of high quality.

<Modification>

It should be noted that the display device 1 of any of the embodiments described above is not limited to the aforementioned configurations, but may also be configured as below. The following description takes a specific configuration of substrates and a specific arrangement of substrates as an example. However, the configuration and arrangement of substrates may be changed in various ways.

(Method for Applying Voltage)

The method for applying a voltage between the electrodes 12 and 22 is not limited to a configuration of switching between DC and AC, but may alternatively be configured to substantially switch between AC and DC (i.e., to adjust a magnitude relationship between a DC component and an AC component) by applying an offset voltage, preferably an offset voltage that is lower than the highest voltage applied on AC, to the opposed electrode (common electrode) and thereby changing the strength (amplitude) of the voltage that is applied on AC.

Further, by changing factors such as (i) the magnitude and the frequency of an AC voltage that is applied between the electrodes 12 and 22 and (ii) the size of the flakes, the display device 1 described in any of the aforementioned embodiments can be configured to carry out halftone display. For example, in a case where flakes of different sizes are used together, it is possible to change the rotation angle of each of the flakes in accordance with the size of the flake. This makes it possible to control light transmittance (i.e., carry out halftone display) in accordance with the magnitude and the frequency of the AC voltage.

(Substrate)

Each of the aforementioned embodiments has been described by taking, as an example, the case where the active matrix substrate is used as at least one of the display surface side substrate and the rear surface side substrate. However, the configuration of the display panel 2 is not limited to this example.

It is possible to simply provide, as electrodes, a solid electrode and a comb electrode (each of which is made of a conductive electrode film such as an ITO or aluminum deposited layers) on the entire inner surfaces of substrates between which a drive layer is provided. Alternatively, electrodes may be patterned so that segment display or passive display can be carried out. Alternatively, as described above, an active matrix substrate such as a TFT substrate may be provided as at least one of the substrates.

Further, on the electrodes of the substrates, a conductive film, an insulating film, or a semiconductor film may or may not be provided. Whether or not to provide such a film or, in a case where such a film is provided, which of the films to be provided is a matter of optimum design that depends on properties of the medium 31 and the shape-anisotropic members 32 (such as flakes).

For example, in a case where (i) the medium 31 is propylene carbonate, (ii) the shape-anisotropic members 32 are aluminum flakes, and (iii) a cell having a cell thickness of approximately 80 µm is used in which a $SiO_2$ film of 1000 Å is provided on an ITO film, application of an electric field of 60 Hz causes the flakes to be longitudinally oriented at approximately 5 V, and application of 5 V on DC does not cause the flakes to rotate to the transverse orientation due to the voltage application. On the other hand, in a case where a cell is used which has a cell thickness of approximately 80 µm and in which no film is provided on an ITO film, application of an electric field of 60 Hz causes the flakes to be longitudinally oriented at approximately 5 V, and application of 5 V on DC causes the flakes to be transversely oriented to adhere to one of the substrates.

The present invention is not limited to the embodiments, but can be altered by a skilled person in the art within the scope of the claims. An embodiment derived from a proper combination of technical means disclosed in respective different embodiments is also encompassed in the technical scope of the present invention.

INDUSTRIAL APPLICABILITY

The display device of the present invention can be suitably used as a transflective display device in a mobile apparatus such as a mobile phone, a PDA, or a digital camera.

REFERENCE SIGNS LIST

1: Display device
2: Display panel
2a: Divisional display area
3: Backlight
3a: Divisional lighting area
4: Image IC
5: Display panel driving circuit
6: Backlight driving circuit
10: Substrate
11: Insulating substrate
12: Electrode
20: Substrate
21: Insulating substrate
22: Electrode 23: Color filter
30: Optical modulation layer
31: Medium
32: Shape-anisotropic member
33: Power source circuit
33a: AC power source
33b: DC power source
33c: DC power source
34: Switch

The invention claimed is:

1. A display device of transflective type comprising:
a display panel; and
a backlight,
said display device carrying out, in a switchable manner, (i) reflection display by reflecting light entered from outside and (ii) transmission display by causing light from the backlight to pass through,
the display panel including:
a first substrate which has a first electrode,
a second substrate which has a second electrode and is arranged so as to face the first substrate, and
an optical modulation layer which contains a plurality of shape-anisotropic members and is provided between the first substrate and the second substrate, each of the plurality of shape-anisotropic members (i) having a reflection surface and (ii) changing, by rotation, an area of a projection image viewed in a normal direction of the substrate,
said display device controlling a transmittance of light, which has entered the optical modulation layer, by rotating the plurality of shape-anisotropic members by changing a frequency of a voltage applied between the first electrode and the second electrode, and
said display device displaying black by multiple reflection of the light that has entered the optical modulation layer and is reflected by the plurality of shape-anisotropic members which are oriented so as to abut on one of the first substrate and the second substrate such that a major axis of each of the plurality of shape-anisotropic members extends in parallel with the one of the first substrate and the second substrate.

2. The display device as set forth in claim 1, wherein:
an amount of the plurality of shape-anisotropic members contained in the optical modulation layer is enough to form at least two layers of the plurality of shape-anisotropic members when the plurality of shape-anisotropic members are spread all over the one of the first substrate and the second substrate.

3. The display device as set forth in claim 1, wherein:
the plurality of shape-anisotropic members are colored.

4. The display device as set forth in claim 1, wherein:
a color filter is provided in each of pixels of the display panel.

5. The display device as set forth in claim 1, wherein:
the voltage applied between the first electrode and the second electrode is switched between (i) DC at which a frequency is 0 Hz or a low frequency which is equal to or lower than a first threshold set in advance and (ii) a high frequency which is equal to or higher than a second threshold set in advance.

6. The display device as set forth in claim 5, wherein:
the major axis of each of the plurality of shape-anisotropic members is oriented in parallel with the first substrate and the second substrate when the voltage applied between the first electrode and the second electrode is the DC or has the low frequency which is equal to or lower than the first threshold; and
the major axis of each of the plurality of shape-anisotropic members is oriented in a direction perpendicular to the first substrate and the second substrate when the voltage applied between the first electrode and the second electrode has the high frequency which is equal to or higher than the second threshold.

7. The display device as set forth in claim 1, wherein:
the plurality of shape-anisotropic members have chargeability.

8. The display device as set forth in claim 7, wherein:
the plurality of shape-anisotropic members abut on one of the first and second substrates which includes an electrode that is electrically charged with a polarity reverse to that of an electric charge of the plurality of shape-anisotropic members; and
on which one of the first substrate and the second substrate the plurality of shape-anisotropic members abut is switched by reversing each of a polarity of an electric charge of the first electrode and a polarity of an electric charge of the second electrode.

9. The display device as set forth in claim 8, wherein:
the plurality of shape-anisotropic members are caused to abut on any one of the first substrate and the second substrate for causing multiple reflection in each of the transmission display and the reflection display so that black is displayed in each of the reflection display and the transmission display only by orienting the plurality of shape-anisotropic members.

10. The display device as set forth in claim 1, wherein:
a light emission surface of the backlight is partitioned into a plurality of divisional lighting areas, and light sources are provided in the respective plurality of divisional lighting areas.

11. The display device as set forth in claim 10, wherein:
a partition is provided in the optical modulation layer in a location which corresponds to a boundary between the plurality of divisional lighting areas of the backlight, when viewed in a direction perpendicular to the substrate.

12. The display device as set forth in claim 10, wherein:
the transmission display and the reflection display are simultaneously carried out by driving the backlight with area active driving.

13. The display device as set forth in claim 10, wherein:
the light sources provided in the respective plurality of divisional lighting areas emit different colors of light, and each of the light sources emits one or more colors of light.

14. The display device as set forth in claim 13, wherein:
each of the light sources emits a single color of light.

15. The display device as set forth in claim 13, wherein:
an emitted light color is switched for each of the plurality of divisional lighting areas.

* * * * *